(12) United States Patent
Takaki et al.

(10) Patent No.: US 9,523,573 B2
(45) Date of Patent: *Dec. 20, 2016

(54) ROTATION ANGLE DETECTION DEVICE AND ELECTRIC POWER STEERING SYSTEM INCLUDING THE SAME

(71) Applicant: JTEKT CORPORATION, Osaka-shi, Osaka (JP)

(72) Inventors: Takeshi Takaki, Shiki-gun (JP); Yuji Kariatsumari, Kitakatsuragi-gun (JP); Yoshinobu Shimizu, Sakai (JP); Yasuyuki Yoshii, Tenri (JP)

(73) Assignee: JTEKT CORPORATION, Osaka-shi (JP)

( * ) Notice: Subject to any disclaimer, the term of this patent is extended or adjusted under 35 U.S.C. 154(b) by 22 days.

This patent is subject to a terminal disclaimer.

(21) Appl. No.: 14/104,408

(22) Filed: Dec. 12, 2013

(65) Prior Publication Data

US 2014/0158453 A1    Jun. 12, 2014

(30) Foreign Application Priority Data

Dec. 12, 2012 (JP) ................................ 2012-271637

(51) Int. Cl.
*G01C 1/00* (2006.01)
*G01D 5/244* (2006.01)
*B62D 5/04* (2006.01)

(52) U.S. Cl.
CPC ............... *G01C 1/00* (2013.01); *B62D 5/0463* (2013.01); *G01D 5/244* (2013.01)

(58) Field of Classification Search
CPC .......... G01C 1/00; B62D 5/0463; G01D 5/244
(Continued)

(56) References Cited

U.S. PATENT DOCUMENTS 7,119,532 B2   10/2006   Nihei et al.
7,218,100 B1    5/2007   Matsumoto et al.
(Continued)

FOREIGN PATENT DOCUMENTS

EP       1018466 A2    7/2000
EP       1108987 A1    6/2001
(Continued)

OTHER PUBLICATIONS

Jun. 3, 2015 Office Action issued in U.S. Appl. No. 14/104,510.
(Continued)

*Primary Examiner* — Mussa A Shaawat
*Assistant Examiner* — Abdhesh Jha
(74) *Attorney, Agent, or Firm* — Oliff PLC

(57) ABSTRACT

Sinusoidal signals ($S_1$, $S_2$) having a phase difference of 120° are output from two magnetic sensors in accordance with rotation of an input shaft. A first rotation angle computation unit computes a rotation angle $\theta(n)$ on the basis of output signals $S_1(n)$, $S_1(n-1)$, $S_2(n)$, $S_2(n-1)$ from the magnetic sensors, which are sampled at two sampling timings. At this time, the first rotation angle computation unit computes the rotation angle $\theta(n)$ on the assumption that there are no variations of amplitudes of the output signals ($S_1$, $S_2$) from each one of the two sensors due to temperature changes between the two sampling timings.

10 Claims, 21 Drawing Sheets

(58) Field of Classification Search
USPC .......................................................... 701/41
See application file for complete search history.

(56) References Cited

U.S. PATENT DOCUMENTS

| | | | |
|---|---|---|---|
| 7,659,713 | B2 | 2/2010 | Nakata et al. |
| 7,969,147 | B2 | 6/2011 | Hatanaka et al. |
| 9,121,729 | B2 | 9/2015 | Ueda |
| 2002/0111763 | A1 | 8/2002 | Koga |
| 2002/0124663 | A1 | 9/2002 | Tokumoto et al. |
| 2003/0042894 | A1 | 3/2003 | Waffenschmidt |
| 2004/0210366 | A1 | 10/2004 | Tomita |
| 2005/0052348 | A1* | 3/2005 | Yamazaki et al. ............. 345/44 |
| 2005/0150712 | A1 | 7/2005 | Tokumoto |
| 2005/0242765 | A1 | 11/2005 | Ta et al. |
| 2007/0107977 | A1 | 5/2007 | Shibata |
| 2008/0035411 | A1 | 2/2008 | Yamashita et al. |
| 2008/0047775 | A1 | 2/2008 | Yamazaki |
| 2008/0052562 | A1 | 2/2008 | Kameya et al. |
| 2008/0167780 | A1 | 7/2008 | Suzuki et al. |
| 2009/0105909 | A1 | 4/2009 | Yamaguchi |
| 2009/0190283 | A1 | 7/2009 | Hammerschmidt et al. |
| 2009/0206827 | A1 | 8/2009 | Aimuta et al. |
| 2009/0230968 | A1 | 9/2009 | Bittar et al. |
| 2009/0240389 | A1 | 9/2009 | Nomura et al. |
| 2010/0045227 | A1 | 2/2010 | Ura et al. |
| 2011/0022271 | A1 | 1/2011 | Ueda et al. |
| 2011/0181292 | A1 | 7/2011 | Oowada |
| 2012/0031697 | A1* | 2/2012 | Matsuda ...................... 180/446 |
| 2012/0109562 | A1 | 5/2012 | Yabuguchi et al. |
| 2012/0143563 | A1 | 6/2012 | Ueda |
| 2012/0158340 | A1* | 6/2012 | Ueda ............................ 702/94 |
| 2012/0158341 | A1 | 6/2012 | Ueda et al. |
| 2012/0182008 | A1 | 7/2012 | Ueda et al. |
| 2012/0182009 | A1 | 7/2012 | Ueda |
| 2012/0273290 | A1 | 11/2012 | Kawano et al. |
| 2012/0274260 | A1 | 11/2012 | Takahashi et al. |
| 2012/0319680 | A1 | 12/2012 | Ueda et al. |
| 2013/0035896 | A1 | 2/2013 | Ueda et al. |

FOREIGN PATENT DOCUMENTS

| | | |
|---|---|---|
| EP | 1 684 051 A1 | 7/2006 |
| EP | 2 466 268 A2 | 6/2012 |
| EP | 2 477 004 A1 | 7/2012 |
| JP | 2002-213944 A | 7/2002 |
| JP | 2006-078392 A | 3/2006 |
| JP | 2007-139739 A | 6/2007 |
| JP | 2008-241411 A | 10/2008 |
| JP | 2008-286709 A | 11/2008 |
| JP | 2010-048760 A | 3/2010 |
| JP | 2010-110147 A | 5/2010 |

OTHER PUBLICATIONS

Apr. 29, 2014 Extended European Search Report issued in European Patent Application No. 13196422.3.
May 9, 2014 Extended European Search Report issued in European Patent Application No. 13196425.8.
Apr. 29, 2014 Extended European Search Report issued in European Patent Application No. 13196421.5.
Apr. 29, 2014 Extended European Search Report issued in European Patent Application No. 13196424.9.
Apr. 29, 2014 Extended European Search Report issued in European Patent Application No. 13196423.1.
Dec. 30, 2015 Office Action issued in U.S. Appl. No. 14/104,510.
Apr. 4, 2014 Extended European Search Report issued in European Patent Application No. 11193347.9.
Jul. 3, 2014 Notice of Reasons for Rejection Issued in Japanese Patent Application No. 2010-279440.
Jun. 10, 2016 Office Action issued in U.S. Appl. No. 14/104,647.
Jul. 15, 2016 Office Action issued in U.S. Appl. No. 14/104,647.
Jul. 6, 2016 Office Action issued in U.S. Appl. No. 14/104,500.
Apr. 22, 2016 Office Action issued in U.S. Appl. No. 14/104,322.
Oct. 11, 2016 Office Action issued in U.S Appl. No. 14/104,510.

* cited by examiner

FIG.12

| RELATIVE POLE NUMBER | E |
|---|---|
| 1 | |
| 2 | |
| 3 | |
| ⋮ | ⋮ |
| 7 | |
| 8 | |
| r1[n-k] ~ r1[n] | |
| r2[n-k] ~ r2[n] | |
| r3[n-k] ~ r3[n] | | e1: rows 1–8
e2: r1[n-k] ~ r1[n]
e3: r2[n-k] ~ r2[n]
e4: r3[n-k] ~ r3[n]

F I G. 20A
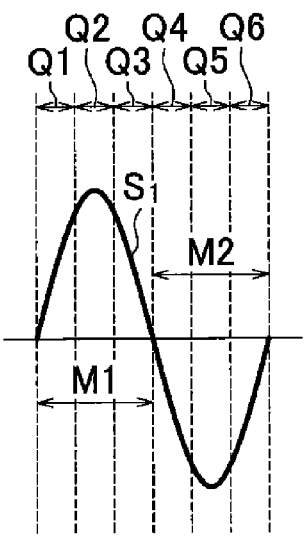
F I G. 20B
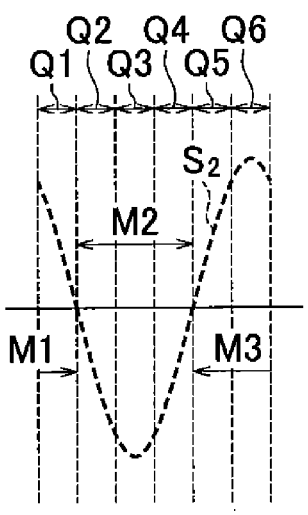
F I G. 20C
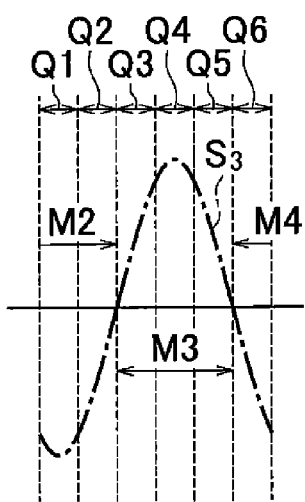

ROTATION ANGLE DETECTION DEVICE AND ELECTRIC POWER STEERING SYSTEM INCLUDING THE SAME

INCORPORATION BY REFERENCE

The disclosure of Japanese Patent Application No. 2012-271637 filed on Dec. 12, 2012 including the specification, drawings and abstract, is incorporated herein by reference in its entirety.

BACKGROUND OF THE INVENTION

1. Field of the Invention

The invention relates to a rotation angle detection device that detects a rotation angle of a rotary body, and an electric power steering system including the rotation angle detection device.

2. Description of the Related Art

As a rotation angle detection device that detects a rotation angle of a rotary body, there has been known a rotation angle detection device that detects a rotation angle of a rotor of a brushless motor with the use of a detection rotor that rotates in accordance with the rotation of the brushless motor. Specifically, as illustrated in FIG. 22, a detection rotor 201 (hereinafter, referred to as "rotor 201") includes a cylindrical magnet 202 having a plurality of magnetic pole pairs corresponding to magnetic pole pairs formed in a rotor of a brushless motor. Two magnetic sensors 221, 222 are arranged around the rotor 201 at a predetermined angular interval around the rotation central axis of the rotor 201. The magnetic sensors 221, 222 respectively output sinusoidal signals having a predetermined phase difference. On the basis of the two sinusoidal signals, a rotation angle of the rotor 201 (a rotation angle of the brushless motor) is detected.

In this example, the magnet 202 has five magnetic pole pairs. That is, the magnet 202 has ten magnetic poles arranged at equal angular intervals. The magnetic poles are arranged at angular intervals of 36° (180° in electrical angle) around the rotation central axis of the rotor 201. Further, the two magnetic sensors 221, 222 are arranged at an angular interval of 18° (90° in electrical angle) around the rotation central axis of the rotor 201.

The direction indicated by an arrow in FIG. 22 is defined as the forward rotation direction of the detection rotor 201. The rotation angle of the rotor 201 increases as the rotor 201 is rotated in the forward direction, whereas the rotation angle of the rotor 201 decreases as the rotor 201 is rotated in the reverse direction. The magnetic sensors 221, 222 output sinusoidal signals $S_1$, $S_2$, respectively. As illustrated in FIG. 23, one period of each of the sinusoidal signals $S_1$, $S_2$ corresponds to a duration in which the rotor 201 rotates an angle of 72° (360° in electrical angle) corresponding to one magnetic pole pair.

The angular range corresponding to one rotation of the rotor 201 is divided into five sections corresponding to the five magnetic pole pairs, a start position of each section is defined as 0°, and an end position of each section is defined as 360°. A rotation angle of the rotor 201 expressed under the above-described conditions is an electrical angle $\theta$ of the rotor 201. In this case, the first magnetic sensor 221 outputs an output signal of $S_1 = A_1 \cdot \sin\theta$, and the second magnetic sensor 222 outputs an output signal of $S_2 = A_2 \cdot \cos\theta$.

Each of $A_1$ and $A_2$ represents an amplitude. If the amplitude $A_1$ of the output signal $S_1$ and the amplitude $A_2$ of the output signal $S_2$ are assumed to be equal to each other, the electrical angle $\theta$ of the rotor 201 is obtained with the use of both the output signals $S_1$, $S_2$ based on the following expression.

$$\theta = \tan^{-1}(\sin\theta / \cos\theta)$$
$$= \tan^{-1}(S_1/S_2)$$

The thus obtained electrical angle $\theta$ is used to control the brushless motor. Refer to, for example, Japanese Patent Application Publication No. 2008-26297 (JP 2008-26297 A).

In the above-described conventional rotation angle detection device, the rotation angle $\theta$ is computed on the assumption that the amplitudes $A_1$, $A_2$ of the output signals $S_1$, $S_2$ output from the magnetic sensors 221, 222 are equal to each other. However, the amplitudes $A_1$, $A_2$ of the output signals $S_1$, $S_2$ vary depending on variations of the temperature characteristics of the magnetic sensors 221, 222 and temperature changes. Therefore, an error may be caused in detection of a rotation angle of the rotor due to variations of the temperature characteristics of the magnetic sensors 221, 222 and temperature changes.

SUMMARY OF THE INVENTION

One object of the invention is to provide a rotation angle detection device that is able to detect a rotation angle with a high degree of accuracy, and an electric power steering system including the rotation angle detection device.

A rotation angle detection device according to an aspect of the invention includes: a plurality of sensors used to detect a rotation angle of a rotary body; a sampling unit that samples an output signal from each of the sensors at prescribed timings; and a computation unit that computes the rotation angle of the rotary body with use of a plurality of the output signals from at least two sensors among the plurality of the sensors, the output signals being sampled at a prescribed number of different timings, the prescribed number being two or more. Where X is the number of multiple expressions obtained by mathematizing each of the plurality of the output signals used by the computation unit to compute the rotation angle of the rotary body and Y is the number of unknown quantities included in the multiple expressions, a condition that Y is greater than X is satisfied. The computation unit is configured to compute the rotation angle of the rotary body by solving simultaneous equations constituted of the multiple expressions after setting Y equal to or smaller than X on an assumption that multiple different unknown quantities of a prescribed kind among the unknown quantities included in the multiple expressions are equal to each other.

In the above-described aspect, the rotation angle of the rotary body is computed on the basis of the plurality of the output signals from at least two sensors among the plurality of the sensors, which are sampled at a prescribed number of different timings, the prescribed number being two or more. Therefore, the rotation angle can be computed with a higher degree of accuracy than that in the above-described conventional technique. In addition, in the above-described aspect, even if the number X of the expressions used to compute the rotation angle of the rotary body is smaller than the number Y of the unknown quantities included in these expressions, the rotation angle of the rotary body can be computed.

Therefore, it is possible to reduce the number of expressions used to compute the rotation angle of the rotary body.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 12 is a schematic diagram illustrating part of contents of a memory in a torque computation ECU;

FIG. 20A is a schematic diagram illustrating the relative pole number setting process;

FIG. 20B is a schematic diagram illustrating the relative pole number setting process;

FIG. 20C is a schematic diagram illustrating the relative pole number setting process;

DETAILED DESCRIPTION OF EMBODIMENTS

Figure 1:
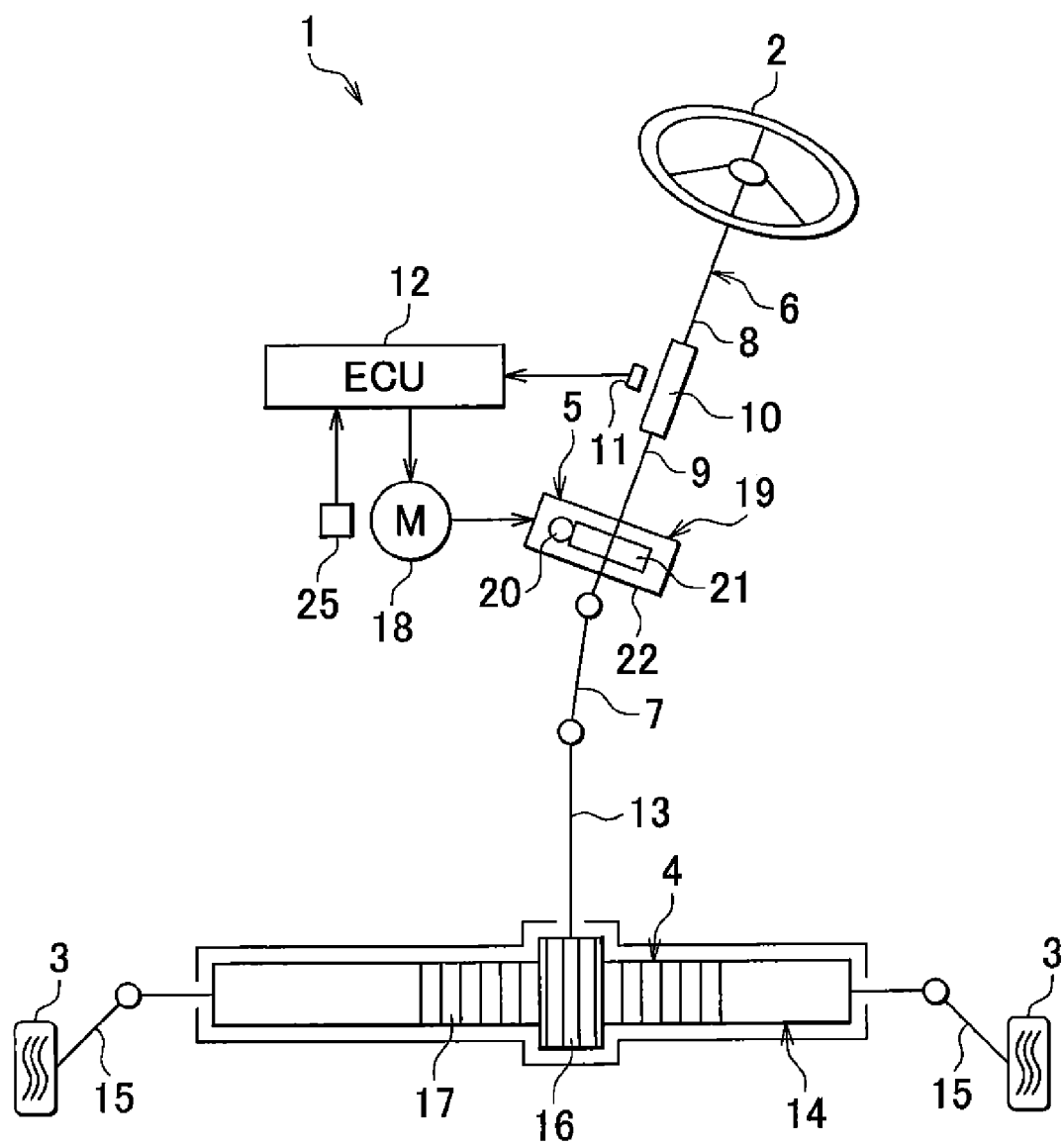
FIG. 1 is a schematic view illustrating the schematic configuration of an electric power steering system to which a rotation angle detection device according to an embodiment of the invention is applied.

Hereinafter, embodiments of the invention will be described with reference to the accompanying drawings. As illustrated in FIG. 1, an electric power steering system 1 includes a steering wheel 2, which serves as a steering member used to steer a vehicle, a steered mechanism 4 that steers steered wheels 3 in accordance with the rotation of the steering wheel 2, and a steering assist mechanism 5 used to assist a driver in performing a steering operation. The steering wheel 2 and the steered mechanism 4 are mechanically connected to each other via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected to each other via a torsion bar 10 so as to be rotatable relative to each other on the same axis. That is, when the steering wheel 2 is rotated, the input shaft 8 and the output shaft 9 rotate in the same direction while rotating relative to each other.

A torque sensor (torque detection device) 11, to which a rotation angle detection device according to an embodiment of the invention is applied, is arranged around the steering shaft 6. The torque sensor 11 detects a steering torque applied to the steering wheel 2 on the basis of a relative rotational displacement between the input shaft 8 and the output shaft 9. The steering torque detected by the torque sensor 11 is input into an electronic control unit 12 for motor control (hereinafter, referred to as "motor control ECU 12").

The steered mechanism 4 is formed of a rack-and-pinion mechanism including a pinion shaft 13 and a rack shaft 14 that serves as a steered shaft. The steered wheels 3 are connected to respective end portions of the rack shaft 14 via tie rods 15 and knuckle arms (not illustrated). The pinion shaft 13 is connected to the intermediate shaft 7. The pinion shaft 13 rotates in accordance with steering of the steering wheel 2. A pinion 16 is connected to a distal end of the pinion shaft 13.

The rack shaft 14 linearly extends along the lateral direction of the vehicle (the direction orthogonal to the direction in which the vehicle travels straight ahead). A rack 17 that meshes with the pinion 16 is formed at an axially intermediate portion of the rack shaft 14. The pinion 16 and the rack 17 convert the rotation of the pinion shaft 13 into an axial movement of the rack shaft 14. By moving the rack shaft 14 in the axial direction, the steered wheels 3 are steered.

When the steering wheel 2 is steered (rotated), the rotation is transmitted to the pinion shaft 13 via the steering shaft 6 and the intermediate shaft 7. The rotation of the pinion shaft 13 is converted into an axial movement of the rack shaft 14 by the pinion 16 and the rack 17. As a result, the steered wheels 3 are steered. The steering assist mechanism 5 includes an electric motor 18 that generates steering assist force and a speed-reduction mechanism 19 that transmits torque output from the electric motor 18 to the steered mechanism 4. The electric motor 18 is formed of a three-phase brushless motor in the present embodiment. The speed-reduction mechanism 19 is formed of a worm gear mechanism including a worm shaft 20 and a worm wheel 21 that meshes with the worm shaft 20. The speed-reduction mechanism 19 is housed in a gear housing 22 that serves as a transmission mechanism housing.

The worm shaft 20 is driven to be rotated by the electric motor 18. The worm wheel 21 is connected to the steering shaft 6 so as to be rotatable in the same direction as the rotation direction of the steering shaft 6. The worm wheel 21 is driven to be rotated by the worm shaft 20. When the worm shaft 20 is driven to be rotated by the electric motor 18, the worm wheel 21 is driven to be rotated, and the steering shaft 6 rotates. The rotation of the steering shaft 6 is transmitted to the pinion shaft 13 via the intermediate shaft 7. The rotation of the pinion shaft 13 is converted into an axial movement of the rack shaft 14. As a result, the steered wheels 3 are steered. That is, when the worm shaft 20 is driven to be rotated by the electric motor 18, the steered wheels 3 are steered.

Figure 2:
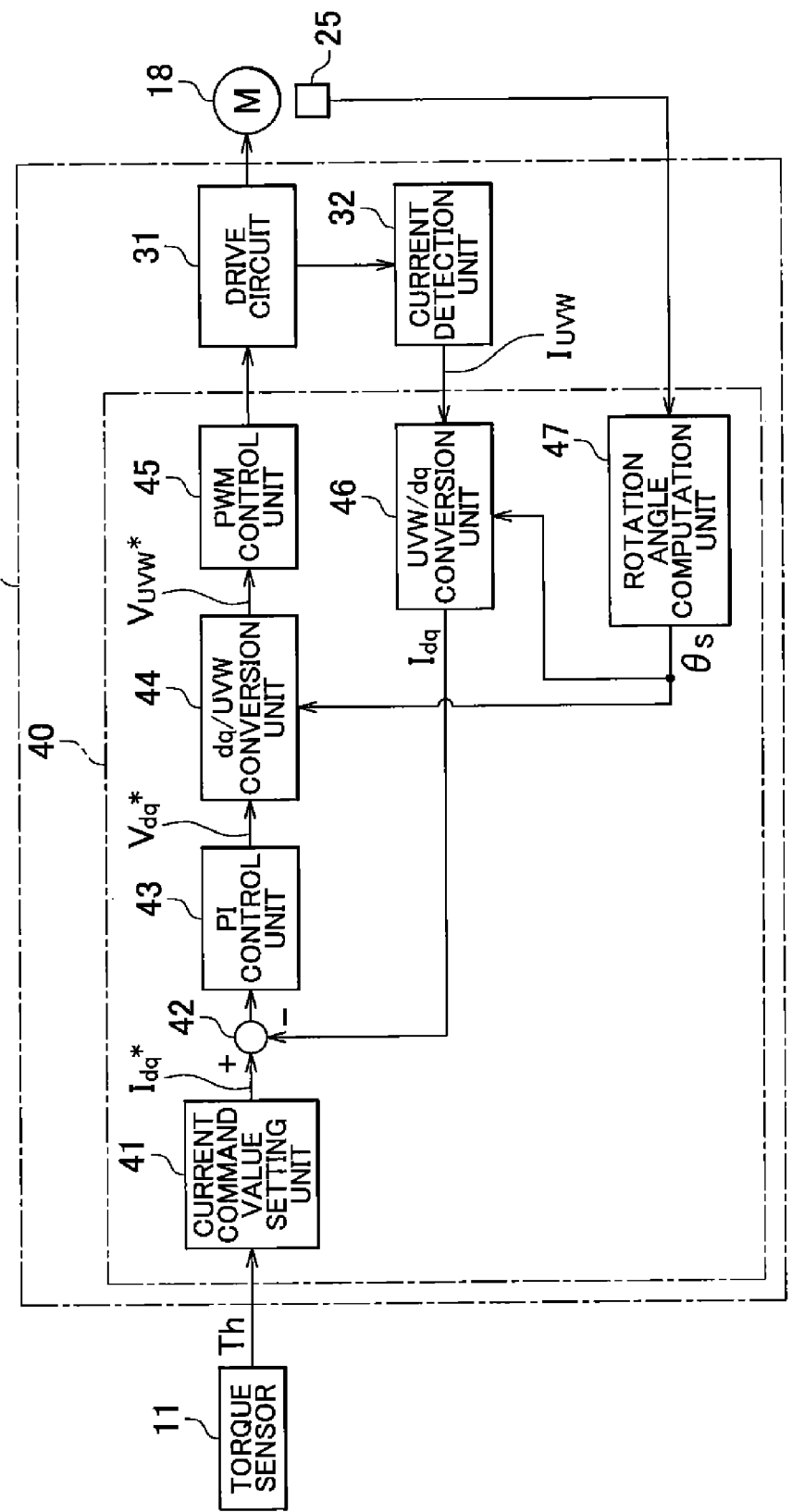
FIG. 2 is a schematic diagram illustrating the electrical configuration of a motor control ECU.

A rotation angle of a rotor of the electric motor 18 (a rotor rotation angle) is detected by a rotation angle sensor 25 such as a resolver. A signal output from the rotation angle sensor 25 is input into the motor control ECU 12. The electric motor 18 is controlled by the motor control ECU 12 that serves as a motor control unit. FIG. 2 is a schematic diagram illustrating the electrical configuration of the motor control ECU 12.

The motor control ECU 12 realizes appropriate steering assistance suited to a steering state, by driving the electric motor 18 on the basis of a steering torque Th detected by the torque sensor 11. The motor control ECU 12 includes a microcomputer 40, a drive circuit (inverter circuit) 31 that is controlled by the microcomputer 40 and that supplies electric power to the electric motor 18, and a current detection unit 32 that detects a motor current passing through the electric motor 18.

Figure 3:
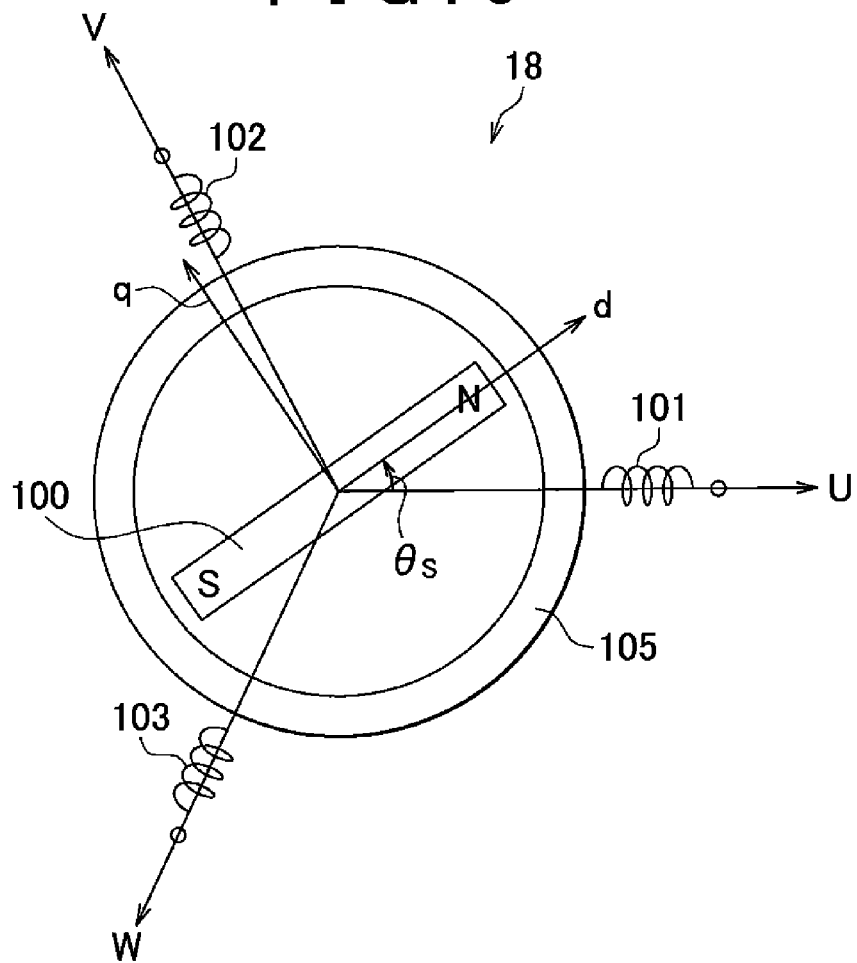
FIG. 3 is a schematic diagram schematically illustrating the configuration of an electric motor.

The electric motor 18 is, for example, a three-phase brushless motor, and includes a rotor 100, which serves as a field magnet, and a stator 105 provided with U-phase, V-phase, and W-phase stator coils 101, 102, 103, as schematically illustrated in FIG. 3. The electric motor 18 may be an electric motor of an inner rotor type, in which a stator is arranged outside a rotor so as to face the rotor, or may be an electric motor of an outer rotor type, in which a stator is arranged inside a tubular rotor so as to face the rotor.

A three-phase fixed coordinate system (a UVW coordinate system) is defined, in which a U-axis, a V-axis, and a W-axis are set to the respective directions of the U-phase stator coil 101, the V-phase stator coil 102 and the W-phase stator coil 103. A two-phase rotating coordinate system (a dq coordinate system: an actual rotating coordinate system) is defined, in which a d-axis (a magnetic pole axis) is set to the magnetic pole direction of the rotor 100 and a q-axis (a torque axis) is set to the direction orthogonal to the d-axis within a rotary plane of the rotor 100. The dq coordinate system is a rotating coordinate system that rotates together with the rotor 100. In the dq coordinate system, because only a q-axis current contributes to generation of torque of the rotor 100, a d-axis current is set to zero and the q-axis current is controlled on the basis of a desired torque. A rotation angle (electrical angle) θ-S of the rotor 100 is a rotation angle of the d-axis with respect to the U-axis. The dq coordinate system is an actual rotating coordinate system that rotates in accordance with the rotor angle θ-S. With the use of the rotor angle θ-S, coordinate conversion between the UVW coordinate system and the dq coordinate system can be executed.

The microcomputer 40 includes a CPU and memories (a ROM, a RAM, a non-volatile memory, etc.), and is configured to function as a plurality of functional processing units by executing predetermined programs. The functional processing units include a current command value setting unit 41, a current deviation computation unit 42, a PI (Proportional Integral) control unit 43, a dq/UVW conversion unit 44, a PWM (Pulse Width Modulation) control unit 45, a UVW/dq conversion unit 46, and a rotation angle computation unit 47.

The rotation angle computation unit 47 computes a rotor rotation angle (electrical angle) (hereinafter, referred to as "rotor angle $\theta_S$") of the electric motor 18 on the basis of a signal output from the rotation angle sensor 25. The current command value setting unit 41 sets current values, which are values of currents that should be passed through coordinate axes of the dq coordinate system, as current command values. Specifically, the current command value setting unit 41 sets a d-axis current command value $I_d^*$ and a q-axis current command value $I_q^*$ (hereinafter, the d-axis current command value $I_d^*$ and the q-axis current command value $I_q^*$ will be collectively referred to as "two-phase current command values $I_{dq}^*$" where appropriate). The current command value setting unit 41 sets the q-axis current command value $I_q^*$ to a significant value, whereas it sets the d-axis current command value $I_d^*$ to zero. Specifically, the current command value setting unit 41 sets the q-axis current command value $I_q^*$ on the basis of the steering torque (detected steering torque) Th detected by the torque sensor 11.

Figure 4:
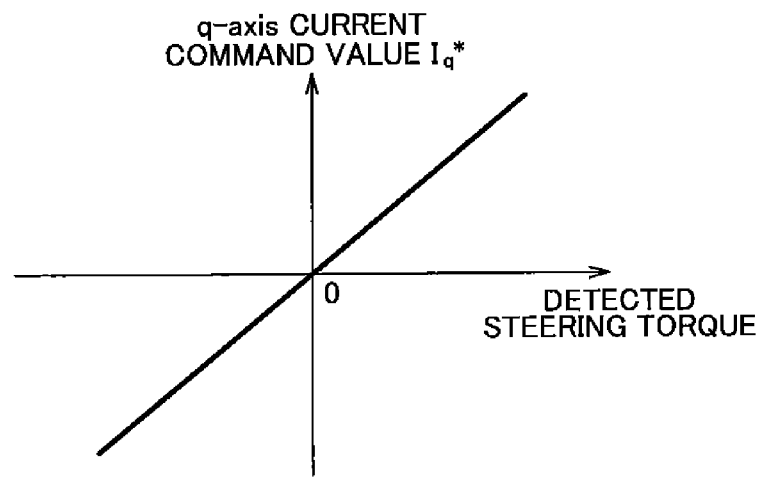
FIG. 4 is a graph illustrating an example of a manner of setting a q-axis current command value $I_q^*$ with respect to a detected steering torque Th.

An example of a manner of setting the q-axis current command value $I_q^*$ with respect to the detected steering torque Th is shown in FIG. 4. With regard to the detected steering torque Th, for example, a torque for steering to the right takes a positive value, and a torque for steering to the left takes a negative value. The q-axis current command value $I_q^*$ takes a positive value when an operation assist force for steering to the right should be generated by the electric motor 18, and takes a negative value when an operation assist force for steering to the left should be generated by the electric motor 18. The q-axis current command value $I_q^*$ with respect to a positive value of the detected steering torque Th takes a positive value, and the q-axis current command value $I_q^*$ with respect to a negative value of the detected steering torque Th takes a negative value. When the detected steering torque Th is zero, the q-axis current command value $I_q^*$ is zero. The q-axis current command value $I_q^*$ is set such that the absolute value of the q-axis current command value $I_q^*$ increases as the absolute value of the detected steering torque Th increases.

The two-phase current command values $I_{dq}^*$ set by the current command value setting unit 41 are provided to the current deviation computation unit 42. The current detection unit 32 detects a U-phase current $I_U$, a V-phase current $I_V$, and a W-phase current $I_W$ for the electric motor 18 (hereinafter, the U-phase current $I_U$, the V-phase current $I_V$, and the W-phase current $I_W$ will be collectively referred to as "three-phase detected currents $I_{UVW}$" where appropriate). The three-phase detected currents $I_{UVW}$ detected by the current detection unit 32 are provided to the UVW/dq conversion unit 46.

The UVW/dq conversion unit 46 executes coordinate conversion from the three-phase detected currents $I_{UVW}$ (the U-phase current $I_U$, the V-phase current $I_V$, and the W-phase current $I_W$) of the UVW coordinate system detected by the current detection unit 32, into two-phase detected currents $I_d$, $I_q$ of the dq coordinate system (hereinafter, the two-phase detected currents $I_d$, $I_q$ will be collectively referred to as "two-phase detected currents $I_{dq}$" where appropriate). The rotor angle $\theta_S$ computed by the rotation angle computation unit 47 is used for this coordinate conversion.

The current deviation computation unit 42 computes deviations between the two-phase current command values $I_{dq}^*$ set by the current command value setting unit 41 and the two-phase detected currents $I_{dq}$ provided from the UVW/dq conversion unit 46. The current deviation computation unit 42 computes a deviation of the d-axis detected current $I_d$ with respect to the d-axis current command value $I_d^*$ and a deviation of the q-axis detected current $I_q$ with respect to the q-axis current command value $I_q^*$. These deviations are provided to the PI control unit 43.

The PI control unit 43 generates two-phase voltage command values $V_{dq}^*$ (the d-axis voltage command value $V_d^*$ and the q-axis voltage command value $V_q^*$), which are values of voltages that should be applied to the electric motor 18, by executing a PI computation on the current deviations computed by the current deviation computation unit 42. The two-phase voltage command values $V_{dq}^*$ are provided to the dq/UVW conversion unit 44. The dq/UVW conversion unit 44 executes coordinate conversion from the two-phase voltage command values $V_{dq}^*$ into three-phase voltage command values $V_{UVW}^*$. The rotor angle $\theta_S$ computed by the rotation angle computation unit 47 is used for this coordinate conversion. The three-phase voltage command values $V_{UVW}^*$ consist of a U-phase voltage command value $V_U^*$, a V-phase voltage command value $V_V^*$, and a W-phase voltage command value $V_W^*$. The three-phase voltage command values $V_{UVW}^*$ are provided to the PWM control unit 45.

The PWM control unit 45 generates a U-phase PWM control signal, a V-phase PWM control signal, and a W-phase PWM control signal having duty ratios corresponding to the U-phase voltage command value $V_U^*$, the V-phase voltage command value $V_V^*$, and the W-phase voltage command value $V_W^*$, respectively, and provides these control signals to the drive circuit 31. The drive circuit 31 is formed of an inverter circuit with three phases corresponding to the U-phase, the V-phase, and the W-phase. When power elements constituting the inverter circuit are controlled by the PWM control signals provided from the PWM control unit 45, voltages corresponding to the three-phase voltage command values $V_{UVW}^*$ are applied to the U-phase stator coil 101, the V-phase stator coil 102 and the W-phase stator coil 103 of the electric motor 18.

Figure 5:
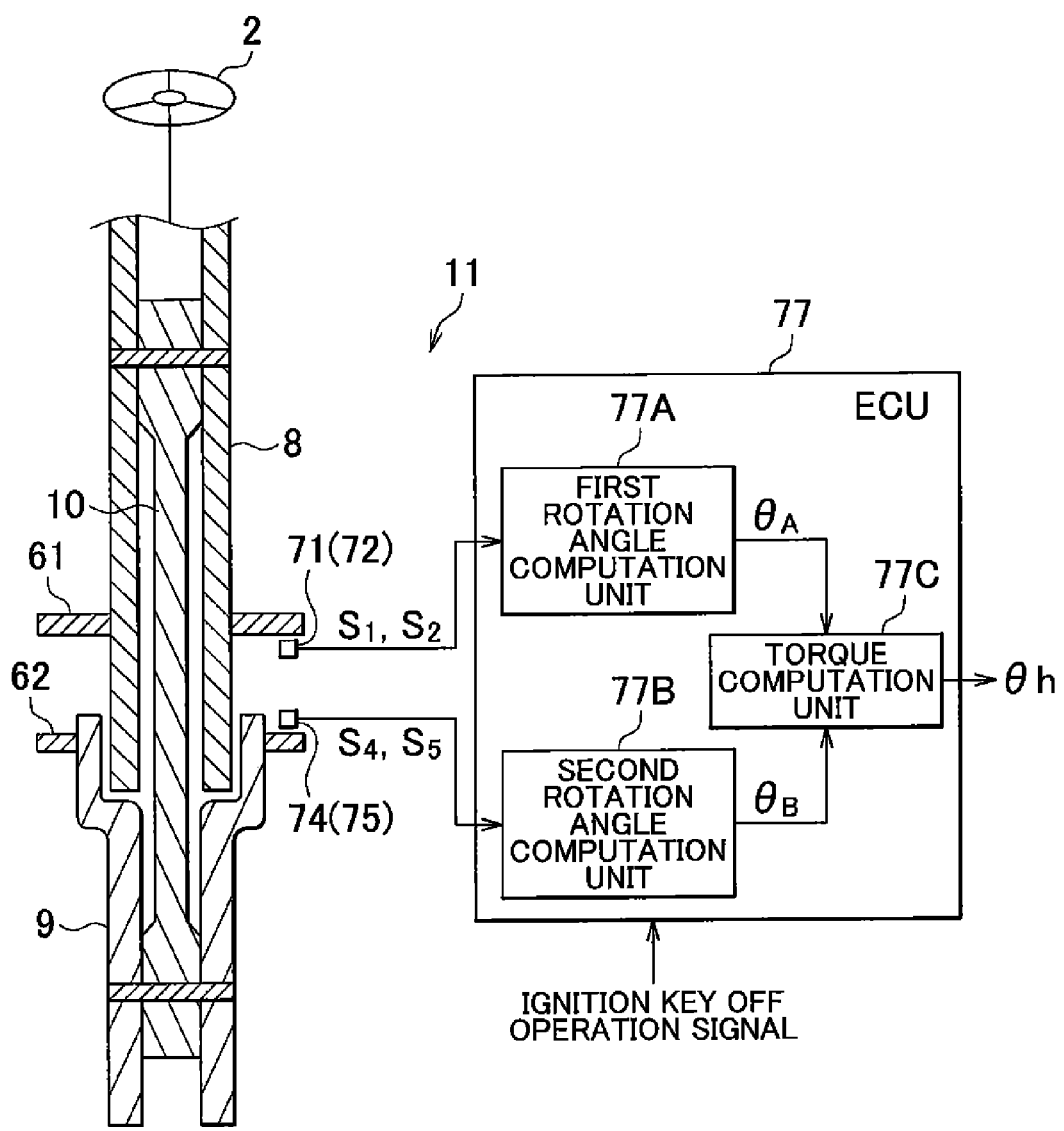
FIG. 5 is a schematic view schematically illustrating the configuration of a torque sensor.

The current deviation computation unit 42 and the PI control unit 43 constitute a current feedback controller. Due to the action of the current feedback controller, motor currents passing through the electric motor 18 are controlled so as to approach the two-phase current command values $I_{dq}^*$ set by the current command value setting unit 41. FIG. 5 is a schematic view schematically illustrating the configuration of the torque sensor 11.

An annular first magnet (a multipolar magnet) 61 is connected to the input shaft 8 so as to be rotatable together with the input shaft 8. Two magnetic sensors 71, 72 that respectively output sinusoidal signals having a phase difference in accordance with the rotation of the first magnet 61 are arranged below the first magnet 61. An annular second magnet (a multipolar magnet) 62 is connected to the output shaft 9 so as to be rotatable together with the output shaft 9. Two magnetic sensors 74, 75 that respectively output sinusoidal signals having a phase difference in accordance with the rotation of the second magnet 62 are arranged above the second magnet 62.

The output signals $S_1$, $S_2$, $S_4$, $S_5$ from the respective magnetic sensors 71, 72, 74, 75 are input into a torque computation ECU 77 used to compute a steering torque that is applied to the input shaft 8. A power supply for the torque computation ECU 77 is turned on when an ignition key is turned on. When the ignition key is turned off, an ignition key off operation signal indicating that the ignition key is turned off is input into the torque computation ECU 77. A magnetic sensor including an element having electrical characteristics that vary due to the action of a magnetic force, for example, a Hall element or a magnetoresistive element (a MR element) may be used as each of the magnetic sensors. In the present embodiment, a Hall element is used as each of the magnetic sensors.

The magnets 61, 62, the magnetic sensors 71, 72, 74, 75, and the torque computation ECU 77 constitute the torque sensor 11. The torque computation ECU 77 includes a microcomputer. The microcomputer is provided with a CPU and memories (a ROM, a RAM, a nonvolatile memory, etc.), and functions as a plurality of functional processing units by executing predetermined programs. The functional processing units include a first rotation angle computation unit 77A, a second rotation angle computation unit 77B, and a torque computation unit 77C.

The first rotation angle computation unit 77A computes a rotation angle (electrical angle $\theta_A$) of the input shaft 8 on the basis of output signals $S_1$, $S_2$ from the two magnetic sensors 71, 72. The second rotation angle computation unit 77B computes a rotation angle (electrical angle $\theta_B$) of the output shaft 9 on the basis of output signals $S_4$, $S_5$ from the two magnetic sensors 74, 75. The torque computation unit 77C computes the steering torque Th applied to the input shaft 8 on the basis of the rotation angle $\theta_A$ of the input shaft 8 detected by the first rotation angle computation unit 77A and the rotation angle $\theta_B$ of the output shaft 9 detected by the second rotation angle computation unit 77B. Specifically, the steering torque Th is computed according to the following expression (1) where K is a spring constant of the torsion bar 10 and N is the number of magnetic pole pairs formed in each of the magnets 61, 62.

$$Th = \{(\theta_A - \theta_B)/N\} \times K \tag{1}$$

The first magnet 61, the magnetic sensors 71, 72, and the first rotation angle computation unit 77A constitute a first rotation angle detection device used to detect the rotation angle $\theta_A$ of the input shaft 8. The second magnet 62, the magnetic sensors 74, 75, and the second rotation angle computation unit 77B constitute a second rotation angle detection device used to detect the rotation angle $\theta_B$ of the output shaft 9. Because an operation of the first rotation angle detection device (the first rotation angle computation unit 77A) is the same as an operation of the second rotation angle detection device (the second rotation angle computation unit 77B), only the operation of the first rotation angle detection device (the first rotation computation unit 77A) will be described below.

Figure 6:
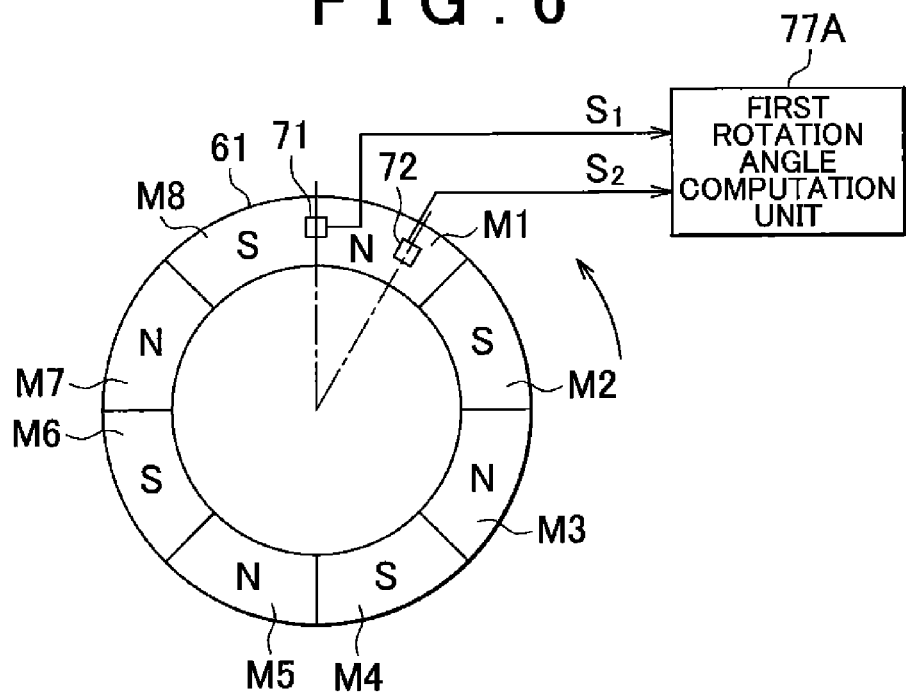
FIG. 6 is a schematic diagram illustrating the configuration of a first magnet and the arrangement of two magnetic sensors.

FIG. 6 is a schematic diagram illustrating the configuration of the first magnet 61 and the arrangement of the two magnetic sensors 71, 72. The first magnet 61 has four magnetic pole pairs (M1, M2), (M3, M4), (M5, M6), (M7, M8) arranged at equal angular intervals in the circumferential direction. That is, the first magnet 61 has the eight magnetic poles M1 to M8 arranged at the equal angular intervals. The magnetic poles M1 to M8 are arranged at angular intervals of approximately 45° (approximately 180° in electrical angle) around the central axis of the input shaft 8. The magnitudes of magnetic forces of the magnetic poles M1 to M8 are substantially equal to each other.

Figure 7:
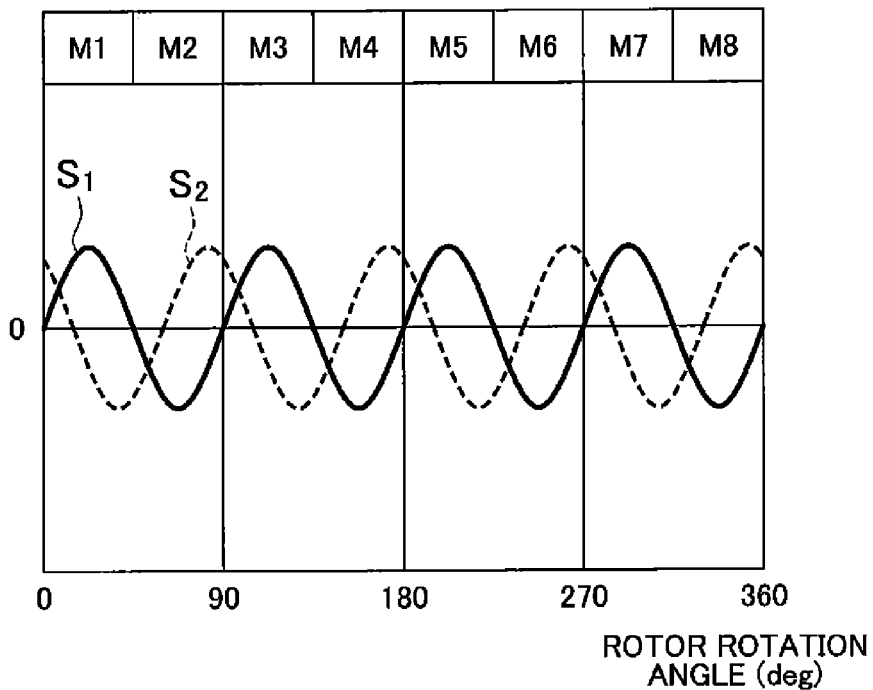
FIG. 7 is a schematic diagram illustrating waveforms of output signals from a first magnetic sensor and a second magnetic sensor.

The two magnetic sensors 71, 72 are arranged so as to face a lower annular end face of the first magnet 61. The magnetic sensors 71, 72 are arranged at an angular interval of 120° in electrical angle around the central axis of the input shaft 8. In the following description, the magnetic sensor 71 will be referred to as a first magnetic sensor 71 and the magnetic sensor 72 will be referred to as a second magnetic sensor 72 where appropriate. The direction indicated by an arrow in FIG. 6 is defined as the forward rotation direction of the input shaft 8. The rotation angle of the input shaft 8 increases as the input shaft 8 is rotated in the forward direction, and the rotation angle of the input shaft 8 decreases as the input shaft 8 is rotated in the reverse direction. Sinusoidal signals $S_1$, $S_2$ are respectively output from the magnetic sensors 71, 72 in accordance with rotation of the input shaft 8, as illustrated in FIG. 7. Note that a rotation angle (deg) on the abscissa axis in FIG. 7 represents a mechanical angle.

In the following description, the output signal $S_1$ from the first magnetic sensor 71 will be referred to as a first output signal $S_1$ or a first sensor value $S_1$, and the output signal $S_2$ from the second magnetic sensor 72 will be referred to as a second output signal $S_2$ or a second sensor value $S_2$ where appropriate. In the following description, a rotation angle of the input shaft 8 will be denoted by $\theta$ instead of $\theta_A$, for convenience of explanation. If each of the output signals $S_1$, $S_2$ is a sinusoidal signal and a rotation angle of the input shaft 8 is $\theta$ (electrical angle), the output signal $S_1$ from the first magnetic sensor 71 is expressed by $S_1 = A_1 \cdot \sin\theta$, and the output signal $S_2$ from the second magnetic sensor 72 is expressed by $S_2 = A_2 \cdot \sin(\theta+120)$. Each of $A_1$ and $A_2$ represents an amplitude. The phase difference between the first output signal $S_1$ and the second output signal $S_2$ is 120°.

A basic concept of a method of computing the rotation angle $\theta$ with the use of the first rotation angle computation unit 77A will be described. There are two methods of computing the rotation angle $\theta$. The first method is a method of computing the rotation angle $\theta$ on the basis of output signals from the two magnetic sensors 71, 72, the output signals being sampled at two sampling timings (hereinafter, the first method will be referred to as "first computing method"). The second method is a method of computing the rotation angle $\theta$ on the basis of output signals from the two magnetic sensors 71, 72, the output signals being sampled at three sampling timings (hereinafter, the second method will be referred to as "second computing method").

A basic concept of the first computing method will be described. A phase difference (electrical angle) between the first output signal $S_1$ and the second output signal $S_2$ will be denoted by C. The number of a present sampling period (the number of a present computation period) will be denoted by (n) and the number of an immediately preceding sampling period (the number of an immediately preceding computation period) will be denoted by (n−1). With the use of the phase difference C and the numbers (n), (n−1) of the sampling periods, the first output signal $S_1$ sampled in the present sampling period, the first output signal $S_1$ sampled in the immediately preceding sampling period, the second output signal $S_2$ sampled in the present sampling period, and the second output signal $S_2$ sampled in the immediately preceding sampling period are expressed by the following expressions (2a), (2b), (2c), (2d), respectively.

$$S_1(n) = A_1(n)\sin\theta(n) \quad (2a)$$

$$S_1(n-1) = A_1(n-1)\sin\theta(n-1) \quad (2b)$$

$$S_2(n) = A_2(n)\sin(\theta(n)+C) \quad (2c)$$

$$S_2(n-1) = A_2(n-1)\sin(\theta(n-1)+C) \quad (2d)$$

If C is a known quantity, the number of unknown quantities ($A_1(n)$, $A_1(n-1)$, $A_2(n)$, $A_2(n-1)$, $\theta(n)$, $\theta(n-1)$) included in the four expressions is six. That is, because the number of the unknown quantities is greater than the number of the expressions, simultaneous equations constituted of the four expressions cannot be solved in this state.

Therefore, by setting a short sampling interval (sampling period), variations of amplitudes due to temperature changes between two sampling timings are assumed to be non-existent. That is, on the assumption that amplitudes $A_1(n)$, $A_1(n-1)$ of the output signals from the first magnetic sensor 71 at two sampling timings are equal to each other, the amplitudes $A_1(n)$, $A_1(n-1)$ are expressed by $A_1$. Similarly, on the assumption that amplitudes $A_2(n)$, $A_2(n-1)$ of the output signals from the second magnetic sensor 72 at two sampling timings are equal to each other, the amplitudes $A_2(n)$, $A_2(n-1)$ are expressed by $A_2$. Thus, the expressions (2a), (2b), (2c), (2d) can be expressed by the following expressions (3a), (3b), (3c), (3d), respectively.

$$S_1(n) = A_1 \sin\theta(n) \quad (3a)$$

$$S_1(n-1) = A_1 \sin\theta(n-1) \quad (3b)$$

$$S_2(n) = A_2 \sin(\theta(n)+C) \quad (3c)$$

$$S_2(n-1) = A_2 \sin(\theta(n-1)+C) \quad (3d)$$

The number of unknown quantities ($A_1$, $A_2$, $\theta(n)$, $\theta(n-1)$) included in the four expressions is four. That is, because the number of the unknown quantities is equal to or smaller than the number of expressions, simultaneous equations constituted of the four expressions can be solved. Therefore, by solving the simultaneous equations constituted of the four expressions (3a), (3b), (3c), (3d), the rotation angle $\theta(n)$ of the input shaft 8 can be computed.

Hereinafter, the case where the phase difference C between the sinusoidal signals respectively output from the magnetic sensors 71, 72 is 120° will be described in detail. When the phase difference C is 120°, the four expressions (3a), (3b), (3c), (3d) can be expressed by the following expressions (4a), (4b), (4c), (4d), respectively.

$$S_1(n) = A_1 \sin\theta(n) \quad (4a)$$

$$S_1(n-1) = A_1 \sin\theta(n-1) \quad (4b)$$

$$S_2(n) = A_2 \sin(\theta(n)+120) \quad (4c)$$

$$S_2(n-1) = A_2 \sin(\theta(n-1)+120) \quad (4d)$$

By solving simultaneous equations constituted of the four expressions (4a), (4b), (4c), (4d), the rotation angle $\theta(n)$ of the input shaft 8 can be expressed by the following expression (5) (hereinafter, referred to as "basic arithmetic expression (5)").

$$\theta[n] = \frac{1}{4}\cos^{-1}\left(1 - \frac{(3p_1^2 p_2^2 - 2p_1^2 - 2p_2^2 + p_1 p_2)^2}{2(p_1 - p_2)^2(p_1^2 + p_1 p_2 + p_2^2)}\right) - \quad (5)$$

$$\frac{1}{4}\cos^{-1}\left(\frac{1}{2} - \frac{3}{2} \cdot \frac{p_1 p_2 + p_2^2}{p_1^2 + p_1 p_2 + p_2^2}\right)$$

where $$p_1 = \frac{S_1[n]}{S_1[n-1]}$$

$$p_2 = \frac{S_2[n]}{S_2[n-1]}$$

In the present embodiment, as arithmetic expressions used to compute the rotation angle θ(n), ten kinds of arithmetic expressions including the basic arithmetic expression (5) are prepared.

Table 1 shows the ten kinds of arithmetic expressions and the conditions for the arithmetic expressions. Note that, at the time of computing the rotation angle θ(n), whether the conditions are satisfied is determined starting from the conditions on the top of Table 1. If it is determined that the conditions are satisfied, whether the subsequent conditions are satisfied is not determined. Then, the rotation angle θ(n) is computed according to the arithmetic expression corresponding to the conditions that are determined to be satisfied.

TABLE 1

| | CONDITIONS (AND) | ARITHMETIC EXPRESSIONS |
|---|---|---|
| 1 | $S_1[n] \neq 0$, $S_2[n-1] \neq 0$, $S_2[n] \neq 0$, $S_1[n-1] \neq 0$, $P_1 - P_2 \neq 0$ | BASIC ARITHMETIC EXPRESSION (EXPRESSION (5)) |
| 2 | $S_1[n] \neq 0$, $S_2[n-1] \neq 0$, $S_2[n] \neq 0$, $S_1[n-1] \neq 0$, $P_1 - P_2 = 0$ | $\theta[n] \leftarrow$ IMMEDIATELY PRECEDING VALUE |
| 3 | $S_1[n] \neq 0$, $S_2[n-1] \neq 0$, $S_2[n] \neq 0$, $S_1[n-1] = 0$, $S_2[n-1] > 0$ | $\theta[n] = \sin^{-1}\left(\frac{\sqrt{3}}{2} \cdot \frac{S_2[n]}{S_2[n-1]}\right) - 120$ |
| 4 | $S_1[n] \neq 0$, $S_2[n-1] \neq 0$, $S_2[n] \neq 0$, $S_1[n-1] = 0$, $S_2[n-1] < 0$ | $\theta[n] = \sin^{-1}\left(-\frac{\sqrt{3}}{2} \cdot \frac{S_2[n]}{S_2[n-1]}\right) - 120$ |
| 5 | $S_1[n] \neq 0$, $S_2[n-1] \neq 0$, $S_2[n] = 0$, $S_1[n] > 0$ | $\theta[n] = 60$ |
| 6 | $S_1[n] \neq 0$, $S_2[n-1] \neq 0$, $S_2[n] = 0$, $S_1[n] < 0$ | $\theta[n] = -120$ |
| 7 | $S_1[n] \neq 0$, $S_2[n-1] = 0$, $S_1[n-1] > 0$ | $\theta[n] = \sin^{-1}\left(\frac{\sqrt{3}}{2} \cdot \frac{S_1[n]}{S_1[n-1]}\right)$ |
| 8 | $S_1[n] \neq 0$, $S_2[n-1] = 0$, $S_1[n-1] < 0$ | $\theta[n] = \sin^{-1}\left(-\frac{\sqrt{3}}{2} \cdot \frac{S_1[n]}{S_1[n-1]}\right)$ |
| 9 | $S_1[n] = 0$, $S_2[n] > 0$ | $\theta[n] = 0$ |
| 10 | $S_1[n] = 0$, $S_2[n] < 0$ | $\theta[n] = 180$ |

Therefore, when the phase difference C between the sinusoidal signals respectively output from the magnetic sensors is 120°, the rotation angle θ(n) of the input shaft 8 can be computed with the use of four sensor values $S_1(n)$, $S_1(n-1)$, $S_2(n)$, $S_2(n-1)$ and the basic arithmetic expression (5). However, when at least one of the denominators of the fractions included in the basic arithmetic expression (5) is zero, the rotation angle θ(n) cannot be computed according to the basic arithmetic expression (5). Therefore, in the present embodiment, when at least one of the denominators of the fractions included in the basic arithmetic expression (5) is zero, the rotation angle θ(n) is computed according to an arithmetic expression different from the basic arithmetic expression (5). Further, in the present embodiment, if the rotation angle θ(n) can be computed according to an arithmetic expression that is simpler than the basic arithmetic expression (5) although the rotation angle θ(n) can be computed according to the basic arithmetic expression (5), the rotation angle θ(n) is computed according to the arithmetic expression that is simpler than the basic arithmetic expression (5). In the present embodiment, the case where the rotation angle θ(n) can be computed more easily than using the basic arithmetic expression (5) is the case where $S_2(n)=0$ or the case where $S_1(n)=0$.

The first arithmetic expression from the top of Table 1 is the basic arithmetic expression (5). The basic arithmetic expression (5) is used when the condition that neither $S_1(n)$ nor $S_2(n)$ is zero and the condition that none of the denominators of the fractions included in the basic arithmetic expression (5) are zero are both satisfied. The condition that none of the denominators of the fractions included in the basic arithmetic expression (5) are zero is satisfied when $p_1-p_2 \neq 0$, $p_1^2+p_1p_2+p_2^2 \neq 0$, $S_1(n-1) \neq 0$, and $S_2(n-1) \neq 0$. Note that $S_1(n-1)$ is the denominator of $p_1$ and $S_2(n-1)$ is the denominator of $p_2$.

Note that, $p_1^2+p_1p_2+p_2^2=0$ is satisfied only when $p_1=p_2=0$. However, the phase of a sinusoidal signal output from the first magnetic sensor 71 is 120° different from the phase of a sinusoidal signal output from the second magnetic sensor 72, and hence the sensor values $S_1$, $S_2$ from both the magnetic sensors 71, 72 do not become zero at the same time. Therefore, $p_1^2+p_1p_2+p_2^2=0$ is not satisfied. Therefore, the condition that none of the denominators of the fractions included in the basic arithmetic expression (5) are zero is satisfied when all the conditions that $p_1-p_2 \neq 0$, $S_1(n-1) \neq 0$, and $S_2(n-1) \neq 0$ are satisfied.

The second arithmetic expression from the top of Table 1 is an arithmetic expression that is used when $p_1-p_2=0$. The case where $p_1-p_2=0$ is satisfied will be considered blow. In this case, because $p_1=p_2$, the following expression (6) is satisfied.

$$\frac{A_1\sin\theta[n]}{A_1\sin\theta[n-1]} = \frac{A_2\sin(\theta[n]+120)}{A_2\sin(\theta[n-1]+120)} \quad (6)$$

When this expression is deformed, the following expression (7) can be obtained.

$$\frac{\sin\theta[n-1]}{\sin\theta[n]} \cdot \frac{\sin(\theta[n]+120)}{\sin(\theta[n-1]+120)} = 1 \quad (7)$$

The case where the expression (7) is satisfied is the case where $\theta(n)$ is equal to $\theta(n-1)$, that is, the case where the present rotation angle $\theta(n)$ is equal to the immediately preceding rotation angle $\theta(n-1)$. When the condition that neither $S_1(n)$ nor $S_2(n)$ is zero, the condition that neither the denominator $S_1(n-1)$ of $p_1$ nor the denominator $S_2(n-1)$ of $p_2$ is zero, and the condition that $p_1-p_2=0$ are all satisfied, the immediately preceding computed rotation angle $\theta(n-1)$ is used as the present rotation angle $\theta(n)$.

The third and fourth arithmetic expressions from the top of Table 1 are arithmetic expressions that are used when the denominator $S_1(n-1)$ of $p_1$ is zero. Because $S_1(n-1)=A_1 \sin\theta(n-1)$, $S_1(n-1)=0$ is satisfied when $\sin\theta(n-1)=0$. That is, when $\theta(n-1)$ is 0° or 180°, $S_1(n-1)$ is zero. Because $S_2(n-1)=A_2 \sin(\theta(n-1)+120)$, $S_2(n-1)>0$ is satisfied when $\theta(n-1)$ is 0°, and $S_2(n-1)<0$ is satisfied when $\theta(n-1)$ is 180°. $\theta(n-1)=0$ is satisfied when $S_1(n-1)=0$ and $S_2(n-1)>0$, and $\theta(n-1)=180$ is satisfied when $S_1(n-1)=0$ and $S_2(n-1)<0$.

When $\theta(n-1)=0$, the expressions (4c), (4d) are expressed by the following expressions (8c), (8d), respectively.

$$S_2(n)=A_2 \sin(\theta(n)+120) \quad (8c)$$

$$S_2(n-1)=A_2 \sin 120=\sqrt{3}/2 \cdot A_2 \quad (8d)$$

The following expression (9) can be obtained from the expression (8d).

$$A_2=(2/\sqrt{3}) \cdot S_2(n-1) \quad (9)$$

When the expression (9) is substituted into the expression (8c), the following expression (10) can be obtained.

$$\sin(\theta(n)+120)=(\sqrt{3}/2) \cdot (S_2(n)/S_2(n-1)) \quad (10)$$

Therefore, the rotation angle $\theta(n)$ can be computed according to the following expression (11).

$$\theta[n] = \sin^{-1}\left(\frac{\sqrt{3}}{2} \cdot \frac{S_2[n]}{S_2[n-1]}\right) - 120 \quad (11)$$

As shown in the third row from the top of Table 1, when the conditions that neither $S_1(n)$ nor $S_2(n)$ is zero, the denominator $S_2(n-1)$ of $p_2$ is not zero, the denominator $S_1(n-1)$ of $p_1$ is zero, and $S_2(n-1)>0$ are all satisfied, the rotation angle $\theta(n)$ is computed according to the arithmetic expression expressed by the expression (11).

On the other hand, when $\theta(n-1)=180$, the expressions (4c), (4d) are expressed by the following expressions (12c), (12d), respectively.

$$S_2(n)=A_2 \sin(\theta(n)+120) \quad (12c)$$

$$S_2(n-1)=A_2 \sin 300=-\sqrt{3}/2 \cdot A_2 \quad (12d)$$

The following expression (13) can be obtained from the expression (12d).

$$A_2=(-2/\sqrt{3}) \cdot S_2(n-1) \quad (13)$$

When the expression (13) is substituted into the expression (12c), the following expression (14) can be obtained.

$$\sin(\theta(n)+120)=(-\sqrt{3}/2) \cdot (S_2(n)/S_2(n-1)) \quad (14)$$

The rotation angle $\theta(n)$ can be computed according to the following expression (15).

$$\theta[n] = \sin^{-1}\left(-\frac{\sqrt{3}}{2} \cdot \frac{S_2[n]}{S_2[n-1]}\right) - 120 \quad (15)$$

As shown in the fourth row from the top of Table 1, when the conditions that neither $S_1(n)$ nor $S_2(n)$ is zero, the denominator $S_2(n-1)$ of $p_2$ is not zero, the denominator $S_1(n-1)$ of $p_1$ is zero, and $S_2(n-1)<0$ are all satisfied, the rotation angle $\theta(n)$ is computed according to the arithmetic expression expressed by the expression (15). The fifth and sixth arithmetic expressions from the top of Table 1 are arithmetic expressions used when $S_2(n)=0$ is satisfied. Because $S_2(n)=A_2 \sin(\theta(n)+120)$, when $\sin(\theta(n)+120)=0$, $S_2(n)=0$ is satisfied. That is, when $\theta(n)$ is −120° or 60°, $S_2(n)=0$ is satisfied. Because $S_1(n)=A_1 \sin\theta(n)$, $S_1(n)<0$ is satisfied when $\theta(n)$ is −120°, and $S_1(n)>0$ is satisfied when $\theta(n)=60°$. $\theta(n)=60$ is satisfied when $S_2(n)=0$ and $S_1(n)>0$, and $\theta(n)=-120$ is satisfied when $S_2(n)=0$ and $S_1(n)<0$.

As shown in the fifth row from the top of Table 1, when the conditions that $S_1(n)$ is not zero, the denominator $S_2(n-1)$ of $p_2$ is not zero, $S_2(n)=0$, and $S_1(n)>0$ are all satisfied, the rotation angle $\theta(n)$ is computed as 60°. Further, as shown in the sixth row from the top of Table 1, when the conditions that $S_1(n)$ is not zero, the denominator $S_2(n-1)$ of $p_2$ is not zero, $S_2(n)=0$, and $S_1(n)<0$ are all satisfied, the rotation angle $\theta(n)$ is computed as −120°.

The seventh and eighth arithmetic expressions from the top of Table 1 are arithmetic expressions used when the denominator $S_2(n-1)$ of $p_2$ is zero. Because $S_2(n-1)=A_2 \sin(\theta(n-1)+120)$, when $\sin(\theta(n-1)+120)=0$, $S_2(n-1)=0$ is satisfied. That is, when $\theta(n-1)$ is −120° or 60°, $S_2(n-1)$ is zero. Because $S_1(n-1)=A_1 \sin\theta(n-1)$, $S_1(n-1)<0$ is satisfied when $\theta(n-1)$ is −120°, and $S_1(n-1)>0$ is satisfied when $\theta(n-1)$ is 60°. Therefore, $\theta(n-1)=60$ is satisfied when $S_2(n-1)=0$ and $S_1(n-1)>0$, and $\theta(n-1)=-120$ is satisfied when $S_2(n-1)=0$ and $S_1(n-1)<0$.

When $\theta(n-1)=60$, the expressions (4a), (4b) are expressed by the following expressions (16a), (16b), respectively.

$$S_1(n)=A_1 \sin\theta(n) \quad (16a)$$

$$S_1(n-1)=A_1 \sin 60=\sqrt{3}/2 \cdot A_1 \quad (16b)$$

On the basis of the expression (16b), the following expression (17) can be obtained.

$$A_1=(2/\sqrt{3}) \cdot S_1(n-1) \quad (17)$$

When the expression (17) is substituted into the expression (16a), the following expression (18) can be obtained.

$$\sin\theta(n)=(\sqrt{3}/2) \cdot (S_1(n)/S_1(n-1)) \quad (18)$$

Therefore, the rotation angle $\theta(n)$ can be computed by the following expression (19).

$$\theta[n] = \sin^{-1}\left(\frac{\sqrt{3}}{2} \cdot \frac{S_1[n]}{S_1[n-1]}\right) \quad (19)$$

As shown in the seventh row from the top of Table 1, when the conditions that $S_1(n)$ is not zero, the denominator $S_2(n-1)$ of $p_2$ is zero, and $S_1(n-1)>0$ are all satisfied, the rotation angle $\theta(n)$ is computed according to the arithmetic expression expressed by the expression (19).

On the other hand, when $\theta(n-1)=-120$, the expressions (4a), (4b) are expressed by the following expressions (20a), (20b), respectively.

$$S_1(n)=A_1 \sin \theta(n) \quad (20a)$$

$$S_1(n-1)=A_1 \sin(-120)=-\sqrt{3}/2 \cdot A_2 \quad (20b)$$

The following expression (21) can be obtained from the expression (20b).

$$A_1=(-2/\sqrt{3})\cdot S_1(n-1) \quad (21)$$

When the expression (21) is substituted into the expression (20a), the following expression (22) can be obtained.

$$\sin \theta(n)=(-\sqrt{3}/2)\cdot(S_1(n)/S_1(n-1)) \quad (22)$$

Therefore, the rotation angle $\theta(n)$ can be computed according to the following expression (23).

$$\theta[n] = \sin^{-1}\left(-\frac{\sqrt{3}}{2} \cdot \frac{S_1[n]}{S_1[n-1]}\right) \quad (23)$$

As expressed by the eighth row from the top of Table 1, when the conditions that $S_1(n)$ is not zero, the denominator $S_2(n-1)$ of $p_2$ is zero, and $S_1(n-1)<0$ are all satisfied, the rotation angle $\theta(n)$ is computed according to an arithmetic expression expressed by the expression (23). The ninth and tenth arithmetic expressions from the top of Table 1 are arithmetic expressions that are used when $S_1(n)=0$ is satisfied. Because $S_1(n)=A_1 \sin \theta(n)$, when $\sin \theta(n)=0$, $S_1(n)=0$ is satisfied. That is, when $\theta(n)$ is 0° or 180°, $S_1(n)=0$ is satisfied. Because $S_2(n)=A_2 \sin(\theta(n)+120)$, $S_2(n)>0$ is satisfied when $\theta(n)$ is 0°, and $S_2(n)<0$ is satisfied when $\theta(n)$ is 180°. Therefore, $\theta(n)=0$ is satisfied when $S_1(n)=0$ and $S_2(n)>0$, and $\theta(n)=180$ is satisfied when $S_1(n)=0$ and $S_2(n)<0$.

As shown in the ninth row from the top of Table 1, when the conditions that $S_1(n)$ is zero and $S_2(n)>0$ are both satisfied, the rotation angle $\theta(n)$ is computed as 0°. Further, as shown in the tenth row from the top of Table 1, when the conditions that $S_1(n)$ is zero and $S_2(n)<0$ are both satisfied, the rotation angle is computed as 180°. According to the first computing method, because the rotation angle $\theta(n)$ of the input shaft 8 is computed on the basis of the output signals from the two magnetic sensors 71, 72, which are sampled at two sampling timings, the highly accurate rotation angle can be computed. Furthermore, according to the first computing method, even if the number of expressions used to compute the rotation angle $\theta(n)$ of the input shaft 8 is smaller than the number of unknown quantities originally included in these expressions, the rotation angle $\theta(n)$ of the input shaft 8 can be computed. As a result, the number of sensor values required to compute the rotation angle $\theta(n)$ of the input shaft 8 can be reduced.

According to the first computing method, by setting a short sampling period, the amplitudes ($A_1(n)$ and $A_1(n-1)$; $A_2(n)$ and $A_2(n-1)$) of the output signals from the same magnetic sensor at the two sampling timings are assumed to be equal to each other. The amplitudes of the output signals from the same magnetic sensor at two sampling timings may be different values due to the influence of temperature changes. However, if the sampling interval is short, a temperature change between the two sampling timings is considerably small. Therefore, the amplitudes of the output signals from the same magnetic sensor at the two sampling timings may be assumed to be equal to each other. In the first computing method, variations of amplitudes due to the influence of temperature changes between the two sampling timings can be compensated for. In the first computing method, because the amplitudes $A_1$, $A_2$ of the output signals from the magnetic sensors 71, 72 are regarded as different unknown quantities, the influence of variations of temperature characteristics between the magnetic sensors 71, 72 can be compensated for. As a result, the highly accurate rotation angle can be detected.

A basic concept of the second computing method will be described below. A phase difference (electrical angle) between the first output signal $S_1$ and the second output signal $S_2$ will be denoted by C. The number of the present sampling period (the number of the present computation period) will be denoted by (n), the number of the immediately preceding sampling period will be denoted by (n-1), and the number of the second preceding sampling period will be denoted by (n-2). A correction value used to correct a rotation angle computing error due to the variations of angular widths (magnetic pole widths) of the magnetic poles M1 to M8 will be referred to as an angular width error correction value, and will be denoted by E.

When the phase difference C, the numbers of the sampling periods (n), (n-1), (n-2), and the angular width error correction value E are used, the first output signals $S_1$ sampled in the present sampling period, the immediately preceding sampling period, and the second preceding sampling period, and the second output signals $S_2$ sampled in the present sampling period, the immediately preceding sampling period, and the second preceding sampling period can be expressed by the following expressions (24a), (24b), (24c), (24d), (24e), (24f), respectively.

$$S_1(n)=A_1(n)\sin(E_1(n)\theta(n)) \quad (24a)$$

$$S_1(n-1)=A_1(n-1)\sin(E_1(n-1)\theta(n-1)) \quad (24b)$$

$$S_1(n-2)=A_1(n-2)\sin(E_1(n-2)\theta(n-2)) \quad (24c)$$

$$S_2(n)=A_2(n)\sin(E_2(n)\theta(n)+C) \quad (24d)$$

$$S_2(n-1)=A_2(n-1)\sin(E_2(n-1)\theta(n-1)+C) \quad (24e)$$

$$S_2(n-2)=A_2(n-2)\sin(E_2(n-2)\theta(n-2)+C) \quad (24f)$$

In the expressions (24a) to (24f), $E_1(x)$ is an angular width error correction value corresponding to a magnetic pole sensed by the first magnetic sensor 71 in an x-th computation period. $E_2(x)$ is an angular width error correction value corresponding to a magnetic pole sensed by the second magnetic sensor 72 in an x-th computation period.

If an angular width of a given magnetic pole is w (electrical angle), an angular width error $\theta_{err}$ (electrical angle) of this magnetic pole can be defined by the following expression (25).

$$\theta_{err}=w-180 \quad (25)$$

The angular width error correction value E for this magnetic pole can be defined by the following expression (26).

$$E=180/w=180/(\theta_{err}+180) \quad (26)$$

The angular width error correction value E for each magnetic pole is a piece of information regarding a magnetic pole width of the magnetic pole. Note that the piece of the information regarding the magnetic pole width of each magnetic pole may be an angular width w of the magnetic pole or an angular width error $\theta_{err}$ of the magnetic pole.

If C is a known quantity, the number of unknown quantities included in the six expressions expressed by the expressions (24a) to (24f) is 16. That is, because the number of the unknown quantities is greater than the number of the expressions, simultaneous equations constituted of the six expressions cannot be solved in this state. Therefore, by setting a short sampling interval (sampling period), variations of amplitudes due to temperature changes between three sampling timings are assumed to be non-existent. That is, on the assumption that amplitudes $A_1(n)$, $A_1(n-1)$, $A_1(n-2)$ of the output signals from the first magnetic sensor 71, which are sampled at three sampling timings, are equal to each other, the amplitudes $A_1(n)$, $A_1(n-1)$, $A_1(n-2)$ are expressed by $A_1$. Similarly, on the assumption that amplitudes $A_2(n)$, $A_2(n-1)$, $A_2(n-2)$ of the output signals from the second magnetic sensor 72, which are sampled at three sampling timings, are equal to each other, the amplitudes $A_2(n)$, $A_2(n-1)$, $A_2(n-2)$ are expressed by $A_2$.

Further, both the magnetic sensors 71, 72 are assumed to sense one and the same magnetic pole at three sampling timings. That is, all the angular width error correction values $E_1(n)$, $E_1(n-1)$, $E_1(n-2)$, $E_2(n)$, $E_2(n-1)$, $E_2(n-2)$ included in the output signals from the magnetic sensors 71, 72, which are sampled at the three sampling timings, are assumed to be angular width error correction values for one and the same magnetic pole, and they will be denoted by E. Thus, the expressions (24a) to (24f) can be expressed by the following expressions (27a) to (27f), respectively.

$$S_1(n)=A_1 \sin(E\theta(n)) \tag{27a}$$

$$S_1(n-1)=A_1 \sin(E\theta(n-1)) \tag{27b}$$

$$S_1(n-2)=A_1 \sin(E\theta(n-2)) \tag{27c}$$

$$S_2(n)=A_2 \sin(E\theta(n)+C) \tag{27d}$$

$$S_2(n-1)=A_2 \sin(E\theta(n-1)+C) \tag{27e}$$

$$S_2(n-2)=A_2 \sin(E\theta(n-2)+C) \tag{27f}$$

The number of unknown quantities ($A_1$, $A_2$, E, $\theta(n)$, $\theta(n-1)$, $\theta(n-2)$) included in these six expressions is six. That is, the number of the unknown quantities is equal to or smaller than the number of the expressions, and hence simultaneous equations constituted of the six expressions can be solved. Therefore, by solving the simultaneous equations constituted of the six expressions (27a) to (27f), the rotation angle $\theta(n)$ of the input shaft 8 can be computed.

Hereinafter, the case where the phase difference C between the sinusoidal signals output from the magnetic sensors 71, 72 is 120° will be described in detail. When the phase difference C is 120°, the six expressions (27a) to (27f) can be expressed by the following expressions (28a) to (28f), respectively.

$$S_1(n)=A_1 \sin(E\theta(n)) \tag{28a}$$

$$S_1(n-1)=A_1 \sin(E\theta(n-1)) \tag{28b}$$

$$S_1(n-2)=A_1 \sin(E\theta(n-2)) \tag{28c}$$

$$S_2(n)=A_2 \sin(E\theta(n)+120) \tag{28d}$$

$$S_2(n-1)=A_2 \sin(E\theta(n-1)+120) \tag{28e}$$

$$S_2(n-2)=A_2 \sin(E\theta(n-2)+120) \tag{28f}$$

According to the basic arithmetic expression (5), $E\theta(n)$ can be expressed by the following expression (29).

$$E\theta[n] = \frac{1}{4}\cos^{-1}\left(1 - \frac{(3p_1^2 p_2^2 - 2p_1^2 - 2p_2^2 + p_1 p_2)^2}{2(p_1 - p_2)^2(p_1^2 + p_1 p_2 + p_2^2)}\right) - \frac{1}{4}\cos^{-1}\left(\frac{1}{2} - \frac{3}{2} \cdot \frac{p_1 p_2 + p_2^2}{p_1^2 + p_1 p_2 + p_2^2}\right) \tag{29}$$

where $$p_1 = \frac{S_1[n]}{S_1[n-1]}$$

$$p_2 = \frac{S_2[n]}{S_2[n-1]}$$

Furthermore, by solving simultaneous equations constituted of the six expressions (28a) to (28f), the angular width error correction value E can be expressed by the following expression (30).

$$E = \frac{1}{240} \cdot \cos^{-1}\left(\frac{q_1^2 t^2 - 2q_1 q_2 t + q_2^2}{2t(S_1[n]S_2[n] - S_1[n-1]S_2[n-1])^2} - 1\right) \tag{30}$$

where $$q_1 = S_1[n-1]^2 - S_1[n]^2$$

$$q_2 = S_2[n]^2 - S_2[n-1]^2$$

$$t = \frac{S_1[n]S_2[n]q_3 + S_1[n-1]S_2[n-1]q_4 + S_1[n-2]S_2[n-2]q_1}{S_1[n]S_2[n]q_5 + S_1[n-1]S_2[n-1]q_0 + S_1[n-2]S_2[n-2]q_2}$$

$$q_3 = S_1[n-2]^2 - S_1[n-1]^2$$

$$q_4 = S_1[n]^2 - S_1[n-2]^2$$

$$q_5 = S_2[n-1]^2 - S_2[n-2]^2$$

$$q_6 = S_2[n-2]^2 - S_2[n]^2$$

By dividing $E\theta(n)$ computed from the expression (29) by the angular width error correction value E obtained from the expression (30), $\theta(n)$ can be obtained. That is, $\theta(n)$ can be obtained according to the following expression (31).

$$\theta(n)=E\theta(n)/E \tag{31}$$

Note that, $E\theta(n)$ is computed according to the arithmetic expression corresponding to the conditions according to Table 1. Further, when at least one of the denominators of the fractions included in the expression (30) is zero, the angular width error correction value E cannot be computed according to the expression (30). Therefore, in the present embodiment, when at least one of the denominators of the fractions included in the expression (30) is zero, the immediately preceding computed angular width error correction value E is used as the present angular width error correction value E.

Note that the case where at least one of the denominators of the fractions included in the expression (30) is zero is the case where at least one of the three conditions expressed by the following expressions (32), (33), (34) is satisfied.

$$S_1[n]S_2[n]-S_1[n-1]S_2[n-1]=0 \tag{32}$$

$$S_1[n]S_2[n]q_3+S_1[n-1]S_2[n-1]q_4+S_1[n-2]S_2[n-2]q_1=0 \tag{33}$$

$$S_1[n]S_2[n]q_5+S_1[n-1]S_2[n-1]q_6+S_1[n-2]S_2[n-2]q_2=0$$

$$q_1=S_1[n-1]^2-S_1[n]^2$$

$$q_2=S_2[n]^2-S_2[n-1]^2$$

$$q_3=S_1[n-2]^2-S_1[n-1]^2$$

$$q_4=S_1[n]^2-S_1[n-2]^2$$

$$q_5=S_2[n-1]^2-S_2[n-2]^2$$

$$q_6=S_2[n-2]^2-S_2[n]^2 \qquad (34)$$

According to the second computing method, because the rotation angle θ(n) of the input shaft 8 is computed on the basis of the output signals from the two magnetic sensors 71, 72, which are sampled at three sampling timings, the highly accurate rotation angle can be computed. In the second computing method, even if the number of expressions used to compute the rotation angle θ(n) of the input shaft 8 is smaller than the number of unknown quantities originally included in these expressions, the rotation angle θ(n) of the input shaft 8 can be computed, and hence the number of sensor values required to compute the rotation angle θ(n) of the input shaft 8 can be reduced.

According to the second computing method, the amplitudes ($A_1(n)$, $A_1(n-1)$ and $A_1(n-2)$; $A_2(n)$, $A_2(n-1)$ and $A_2(n-2)$) of the output signals from the same magnetic sensor, which are sampled at the three sampling timings, are assumed to be equal to each other. The amplitudes of the output signals from the same magnetic sensor, which are sampled at three sampling timings, may be different values due to the influence of temperature changes. However, if the sampling interval is short, a temperature change between the three sampling timings is considerably small. Therefore, the amplitudes of the output signals from the same magnetic sensor, which are sampled at the three sampling timings, may be assumed to be equal to each other. Therefore, in the second computing method, variations of amplitudes due to the influence of temperature changes between the three sampling timings can be compensated for. In the second computing method, because the amplitudes $A_1$, $A_2$ of the output signals from the magnetic sensors 71, 72 are regarded as different unknown quantities, the influence of variations of temperature characteristics between the magnetic sensors 71, 72 can be compensated for. As a result, the highly accurate rotation angle can be detected.

In the second computing method, all the angular width error correction values E included in the six expressions used to compute the rotation angle θ(n) are assumed to be equal to each other. The angular width error correction value E varies from one magnetic pole to another. Therefore, the angular width error correction values E included in the expressions that express the six output signals $S_1(n)$, $S_1(n-1)$, $S_1(n-2)$, $S_2(n)$, $S_2(n-1)$, $S_2(n-2)$ used to compute the rotation angle θ(n) do not always take the same value. However, when the two magnetic sensors 71, 72 sense one and the same magnetic pole at three sampling timings, all the angular width error correction values E included in the expressions that express the output signals take the same value. Therefore, in the second computing method, when the two magnetic sensors 71, 72 sense one and the same magnetic pole at three sampling timings, variations of angular widths (magnetic pole widths) of the magnetic poles M1 to M8 of the magnet 61 can be compensated for. As a result, the highly accurate rotation angle can be detected.

Figure 8:
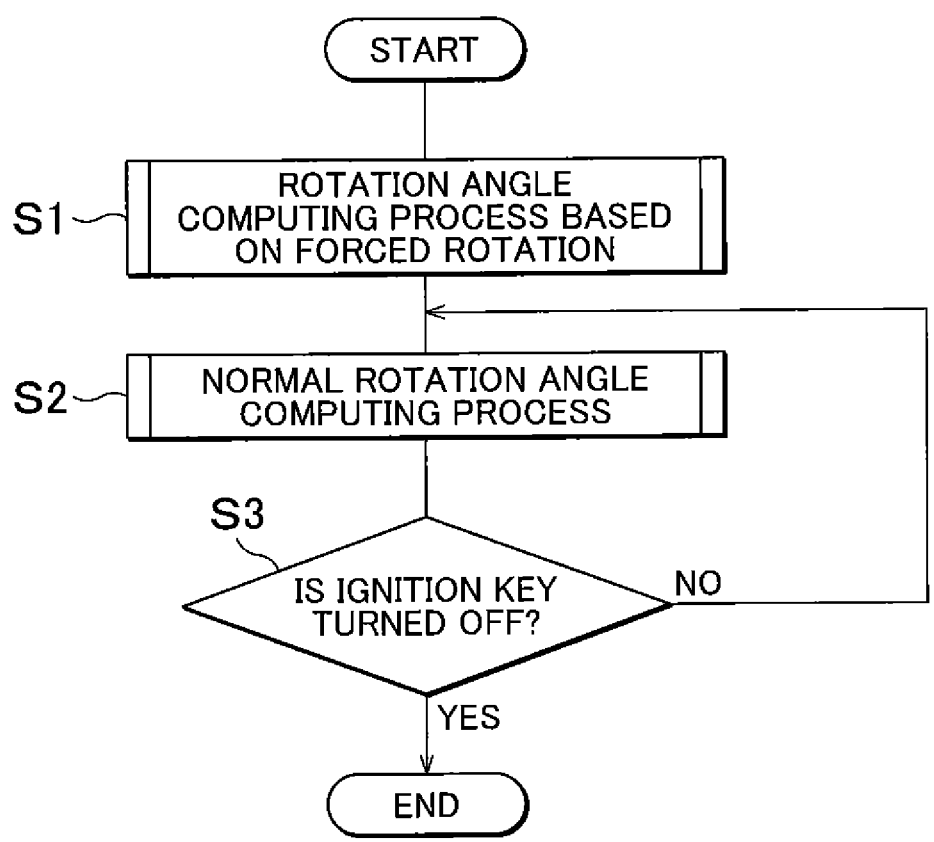
FIG. 8 is a flowchart showing the operation of a first rotation angle computation unit.

FIG. 8 is a flowchart showing the operation of the first rotation angle computation unit 77A. When a power supply for the torque computation ECU 77 is turned on, the first rotation angle computation unit 77A executes a rotation angle computing process based on forced rotation (step S1). In this process, the electric motor 18 is forced to rotate temporarily to rotate the input shaft 8 (the output shaft 9), and the rotation angle θ of the input shaft 8 is computed. Details of the process will be described later.

In the first computing method and the second computing method, if there is no change in the output signals $S_1$, $S_2$ output from the magnetic sensors 71, 72 between the immediately preceding sampling timing and the present sampling timing, $p_1=p_2$ is satisfied, and hence the immediately preceding computed rotation angle θ(n) is used as the rotation angle θ(n) (see the second arithmetic expression from the top of Table 1). However, at the time when the power supply for the torque computation ECU 77 is turned on by turning on the ignition key, there is no immediately preceding computed rotation angle θ(n). Therefore, if the output signals $S_1$, $S_2$ from the respective magnetic sensors 71, 72 do not change after the power supply for the torque computation ECU 77 is turned on, the rotation angle θ(n) cannot be computed. Therefore, in order to create an immediately preceding value of the rotation angle θ(n), the rotation angle computing process based on forced rotation is executed.

When the rotation angle computing process based on forced rotation ends, the first rotation angle computation unit 77A executes a normal rotation angle computing process (step S2). Details of the process will be described later. The normal rotation angle computing process is continuously executed until the ignition key is turned off. When the ignition key is turned off (YES in step S3), the first rotation angle computation unit 77A ends the normal rotation angle computing process.

Figure 9:
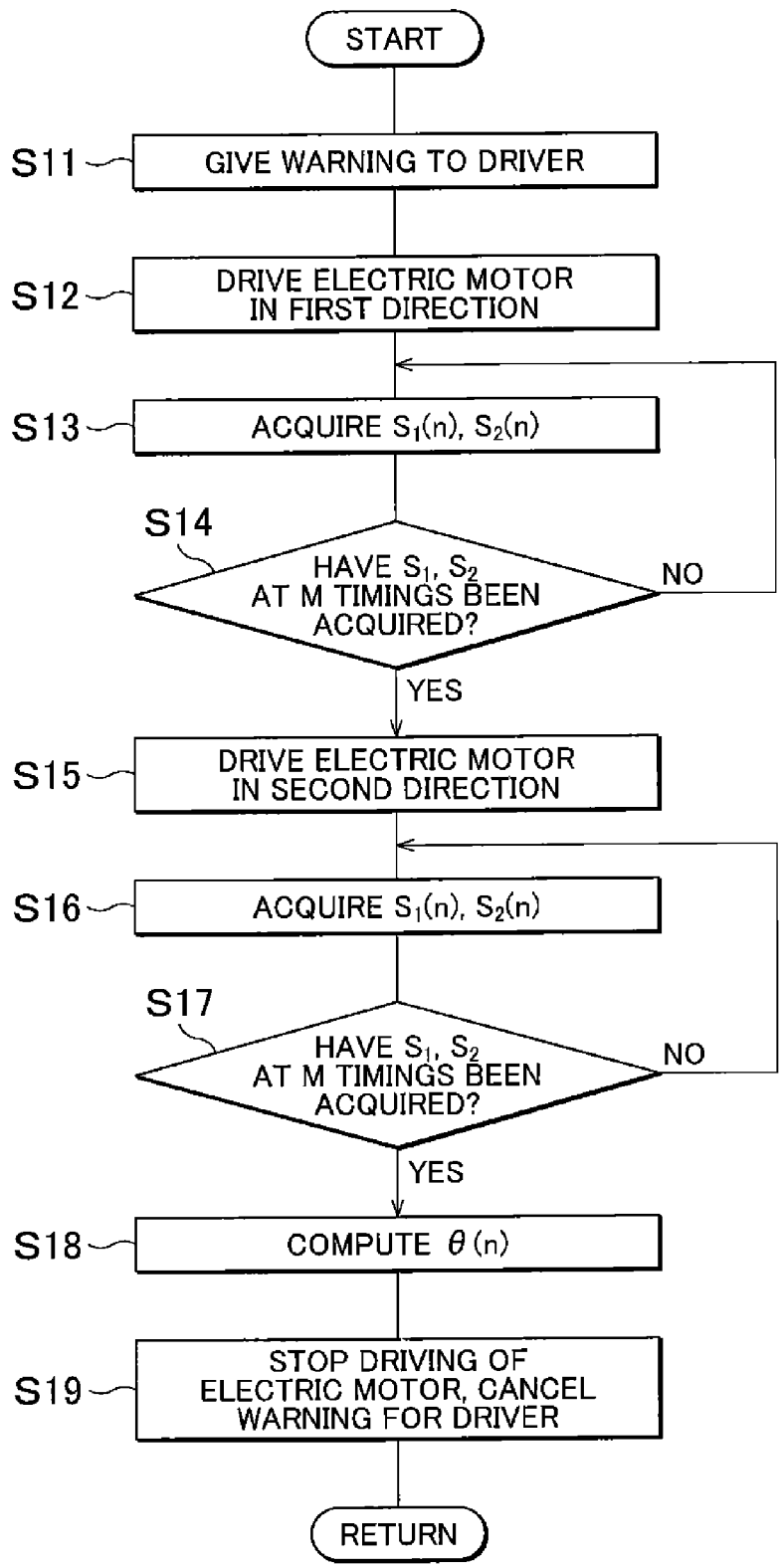
FIG. 9 is a flowchart showing the procedure of a rotation angle computing process based on forced rotation in step S1 in FIG. 8.

FIG. 9 is a flowchart showing the procedure of the rotation angle computing process based on forced rotation in step S1 in FIG. 8. In the rotation angle computing process based on forced rotation, the steering wheel 2 automatically rotates for a short time. Therefore, there is a possibility that a driver will erroneously recognize that a failure has occurred. Thus, the first rotation angle computation unit 77A gives the driver a warning (step S11). Specifically, the first rotation angle computation unit 77A transmits a warning output command to an image-voice control unit (not illustrated) used to control, for example, a display unit (not illustrated), and a voice output device (not illustrated) arranged in the vehicle. Upon reception of the warning output command, the image-voice control unit causes the display unit to display a message "STEERING WHEEL IS FORCEDLY ROTATED, BUT THERE IS NO FAILURE", or causes the voice output device to output the message.

Then, the first rotation angle computation unit 77A drives the electric motor 18 to rotate the electric motor 18 in a first direction (step S12). Specifically, the first rotation angle computation unit 77A transmits, to the motor control ECU 12, a first forced rotation command according to which the electric motor 18 is driven to be rotated in the first direction. Upon reception of the first forced rotation command, the motor control ECU 12 drives the electric motor 18 to rotate the electric motor 18 in the first direction.

The first rotation angle computation unit 77A obtains sensor values $S_1(n)$, $S_2(n)$ from the respective magnetic sensors 71, 72 (step S13). A memory in the torque computation ECU 77 stores sensor values obtained at least at three timings. That is, the memory in the torque computation ECU 77 stores the sensor values from the sensor value obtained M-th preceding timing (M is a prescribed value) to the sensor value obtained most recently. After the electric motor 18 is driven to be rotated in the first direction, the first rotation angle computation unit 77A determines whether the sensor values $S_1$, $S_2$ at M timings have been obtained (step S14). When the rotation angle $\theta(n)$ of the input shaft 8 is computed in step S18 (described later) according to the first computing method, M is set to 2. When the rotation angle $\theta(n)$ of the input shaft 8 is computed in step S18 according to the second computing method, M is set to 3.

When the sensor values $S_1$, $S_2$ at M timings have not been obtained (NO in step S14), the first rotation angle computation unit 77A returns to step S13 and obtains the sensor values $S_1(n)$, $S_2(n)$. The sampling period for sampling the sensor values $S_1(n)$, $S_2(n)$ in the case where the process in step S13 is repeated is determined in advance. When it is determined in step S14 that the sensor values $S_1$, $S_2$ at M timings have been obtained (YES in step S14), the first rotation angle computation unit 77A drives the electric motor 18 to rotate the electric motor 18 in a second direction that is the opposite direction of the first direction (step S15). Specifically, the first rotation angle computation unit 77A transmits, to the motor control ECU 12, a second forced rotation command according to which the electric motor 18 is driven to be rotated in the second direction. Upon reception of the second forced rotation command, the motor control ECU 12 drives the electric motor 18 to rotate the electric motor 18 in the second direction.

Then, the first rotation angle computation unit 77A obtains sensor values $S_1(n)$, $S_2(n)$ from the respective magnetic sensors 71, 72 (step S16). After the electric motor 18 is driven to be rotated in the second direction, the first rotation angle computation unit 77A determines whether the sensor values $S_1$, $S_2$ at M timings have been obtained (step S17). When the sensor values $S_1$, $S_2$ at M timings have not been obtained (NO in step S14), the first rotation angle computation unit 77A returns to step S16, and obtains the sensor values $S_1(n)$, $S_2(n)$. The sampling period for sampling the sensor values $S_1(n)$, $S_2(n)$ in the case where the process in step S16 is repeated is determined in advance.

When it is determined in step S17 that the sensor values $S_1$, $S_2$ at M timings have been obtained (YES in step S17), the first rotation angle computation unit 77A computes the rotation angle $\theta(n)$ of the input shaft 8 on the basis of the sensor values $S_1$, $S_2$ obtained at M timings and stores the computed rotation angle $\theta(n)$ (step S18). Note that the memory stores the most recent sensor values $S_1$, $S_2$ obtained at M timings. When M is set to 2, the first rotation angle computation unit 77A computes the rotation angle $\theta(n)$ of the input shaft 8 according to the first computing method. On the other hand, when M is set to 3, the first rotation angle computation unit 77A computes the rotation angle $\theta(n)$ of the input shaft 8 according to the second computing method.

Then, the first rotation angle computation unit 77A stops driving of the electric motor 18 and cancels the warning for the driver (step S19). Specifically, the first rotation angle computation unit 77A transmits a driving stop command for the electric motor 18 to the motor control ECU 12, and also transmits a warning cancellation command to the image-voice control unit. Upon reception of the driving stop command for the electric motor 18, the motor control ECU 12 stops driving of the electric motor 18. Upon reception of the warning cancellation command, the image-voice control unit cancels the warning display, the warning voice output, or the like. The rotation angle computing process based on forced rotation ends.

Figure 10:
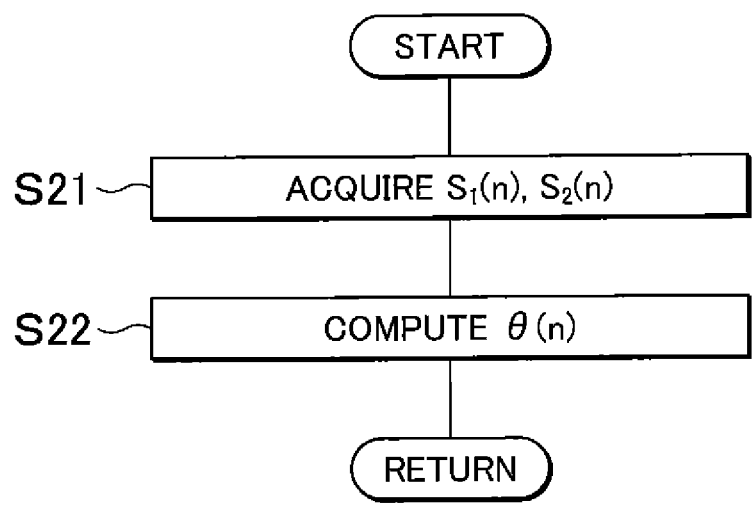
FIG. 10 is a flowchart showing the procedure of a normal rotation angle computing process in step S2 in FIG. 8.

FIG. 10 is a flowchart showing the procedure of the normal rotation angle computing process in step S2 in FIG. 8. The process in FIG. 10 is repeatedly executed with a predetermined computation period (sampling period). The first rotation angle computation unit 77A obtains the sensor values $S_1(n)$, $S_2(n)$ (step S21). The first rotation angle computation unit 77A computes the rotation angle $\theta(n)$ of the input shaft 8 on the basis of the most recent sensor values $S_1$, $S_2$ obtained at M timings, including the presently obtained sensor values $S_1(n)$, $S_2(n)$ (step S22). When M is set to 2, the first rotation angle computation unit 77A computes the rotation angle $\theta(n)$ of the input shaft 8 according to the first computing method. On the other hand, when M is set to 3, the first rotation angle computation unit 77A computes the rotation angle $\theta(n)$ of the input shaft 8 according to the second computing method.

The sensor values $S_1(n-1)$, $S_2(n-1)$ obtained at immediately preceding timing and the rotation angle $\theta(n-1)$ computed at immediately preceding timing are stored as the sensor values $S_1(n-2)$, $S_2(n-2)$ obtained at second immediately preceding timing and the rotation angle $\theta(n-2)$ computed at second immediately preceding timing, respectively. The presently obtained sensor values $S_1(n)$, $S_2(n)$ and the presently computed rotation angle $\theta(n)$ are stored as the sensor values $S_1(n-1)$, $S_2(n-2)$ obtained at immediately preceding timing and the rotation angle $\theta(n-1)$ computed at immediately preceding timing, respectively.

Figure 11:
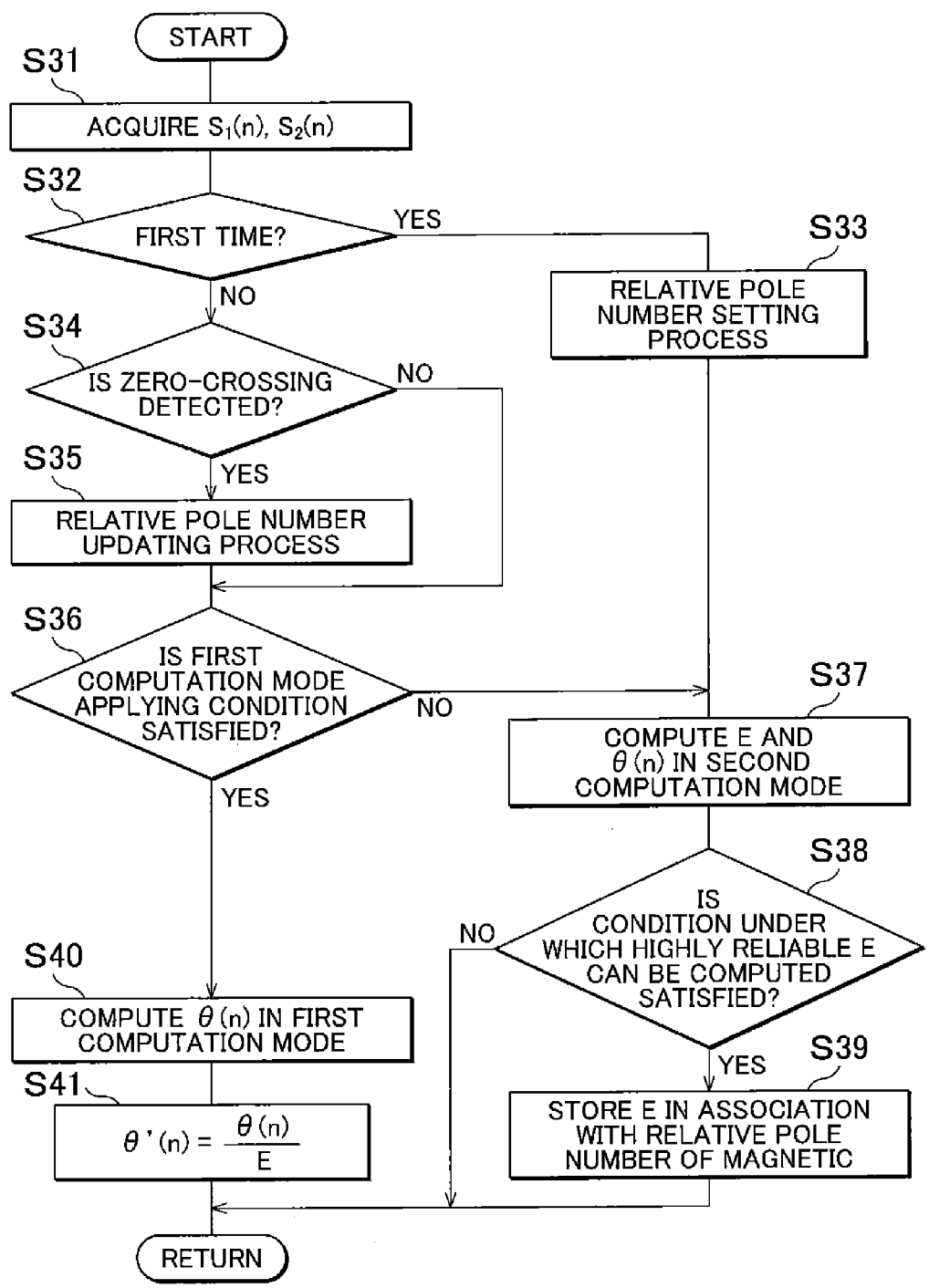
FIG. 11 is a flowchart showing the procedure of another example of the normal rotation angle computing process in step S2 in FIG. 8.

FIG. 11 is a flowchart showing the procedure of another example of the normal rotation angle computing process in step S2 in FIG. 8. The process in FIG. 11 is repeatedly executed with a predetermined computation period (sampling period). The numbers assigned to the magnetic poles, as relative numbers, using the magnetic pole sensed by the first magnetic sensor 71 at the start of the normal rotation angle computing process as a reference magnetic pole are defined as relative pole numbers. The relative pole number of a magnetic pole sensed by the first magnetic sensor 71 (hereinafter, referred to as "first relative pole number") is expressed by a variable r1, and the relative pole number of a magnetic pole sensed by the second magnetic sensor 72 (hereinafter, referred to as "second relative pole number") is expressed by a variable r2. Each of the relative pole numbers r1, r2 takes an integer from one to eight, the relative pole number that is smaller than one by one is eight, and the relative pole number that is greater than eight by one is one. In the present embodiment, when the magnetic pole (the reference magnetic pole) sensed by the first magnetic sensor 71 at the start of the normal rotation angle computing process is a north pole, a relative pole number of "1" is assigned to the magnetic pole. On the other hand, when the magnetic pole (the reference magnetic pole) sensed by the first magnetic sensor 71 at the start of the normal rotation angle computing process is a south pole, a relative pole number of "2" is assigned to the magnetic pole.

The mode in which the rotation angle $\theta(n)$ is computed according to the first computing method will be referred to as a first computation mode, and the mode in which the rotation angle $\theta(n)$ is computed according to the second computing method will be referred to as a second computation mode. As illustrated in FIG. 12, in the memory of the torque computation ECU 77, there are provided an area e1 where the angular width error correction values E are stored in association with the relative magnetic pole numbers 1 to 8, an area e2 where the first relative pole numbers r1(n−k) to r1(n) (k is a natural number equal to or greater than three) for multiple computation periods are stored, an area e3 where the second relative pole numbers r2(n−k) to r2(n) for multiple computation periods are stored, and the like.

As shown in FIG. 11, the first rotation angle computation unit 77A obtains the sensor values $S_1(n)$, $S_2(n)$ (step S31). The first rotation angle computation unit 77A determines whether the present process is the first process after the start of the normal rotation angle computing process (step S32). If the present process is the first process after the start of the normal rotation angle computing process (YES in step S32), the first rotation angle computation unit 77A executes a relative pole number setting process (step S33).

Figure 13:
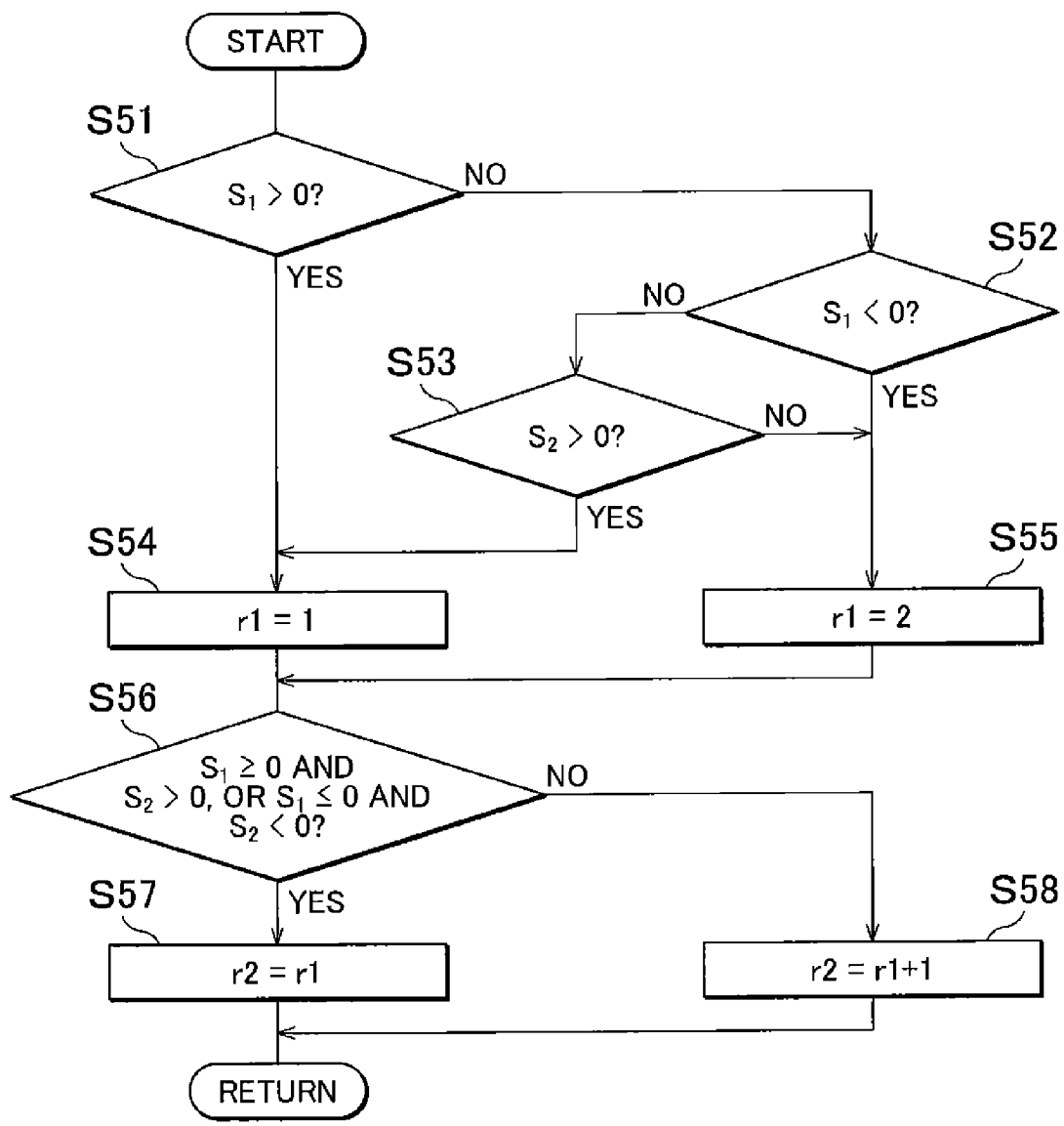
FIG. 13 is a flowchart showing the detailed procedure of a relative pole number setting process.

FIG. 13 is a flowchart showing the detailed procedure of the relative pole number setting process. The first rotation angle computation unit 77A determines whether the first output signal $S_1$ is greater than zero (step S51). If the first output signal $S_1$ is greater than zero (YES in step S51), the first rotation angle computation unit 77A determines that the magnetic pole sensed by the first magnetic sensor 71 is a north pole and sets the first relative pole number r1 to one (step S54). Then, the first rotation angle computation unit 77A proceeds on to step S56.

If the first output signal $S_1$ is equal to or smaller than zero (NO in step S51), the first rotation angle computation unit 77A determines whether the first output signal $S_1$ is smaller than zero (step S52). If the first output signal $S_1$ is smaller than zero (YES in step S52), the first rotation angle computation unit 77A determines that the magnetic pole sensed by the first magnetic sensor 71 is a south pole and sets the first relative pole number r1 to 2 (step S55). Then, the first rotation angle computation unit 77A proceeds on to step S56.

If it is determined in step S52 that the first output signal $S_1$ is equal to or greater than zero (NO in step S52), that is, if the first output signal $S_1$ is zero, the first rotation angle computation unit 77A determines whether the second output signal $S_2$ is greater than zero in order to determine whether the rotation angle of the input shaft 8 is 0° or 180° (step S53). If the second output signal $S_2$ is greater than zero (YES in step S53), the first rotation angle computation unit 77A determines that the rotation angle of the input shaft 8 is 0° and sets the first relative pole number r1 to one (step S54). Then, the first rotation angle computation unit 77A proceeds on to step S56.

If the second output signal $S_2$ is equal to or smaller than zero (NO in step S53), the first rotation angle computation unit 77A determines that the rotation angle of the input shaft 8 is 180° and sets the first relative pole number r1 to 2 (step S55). Then, the first rotation angle computation unit 77A proceeds on to step S56. In step S56, the first rotation angle computation unit 77A determines whether the condition that "$S_1 \geq 0$ and $S_2 > 0$" or the condition that "$S_1 \leq 0$ and $S_2 < 0$" is satisfied. When one of the above-described conditions is satisfied (YES in step S56), the first rotation angle computation unit 77A determines that the pole number of the magnetic pole sensed by the second magnetic sensor 72 is the same as the pole number of the magnetic pole sensed by the first magnetic sensor 71, and sets the second relative pole number r2 to the same number (r2=r1) as the first relative pole number r1 (step S57). Then, the first rotation angle computation unit 77A proceeds on to step S37 in FIG. 11.

When none of the conditions in step S56 are satisfied (NO in step S56), the first rotation angle computation unit 77A determines that the pole number of the magnetic pole sensed by the second magnetic sensor 72 is greater by one than the pole number of the magnetic pole sensed by the first magnetic sensor 71, and sets the second relative pole number r2 to a number greater by one than the first relative pole number r1 (r2=r1+1) (step S58). Then, the first rotation angle computation unit 77A proceeds on to step S37 in FIG. 11.

Figure 14A:
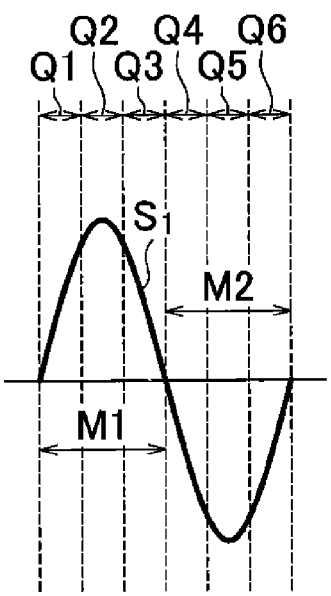
FIG. 14A is a schematic diagram illustrating the relative pole number setting process.
Figure 14B:
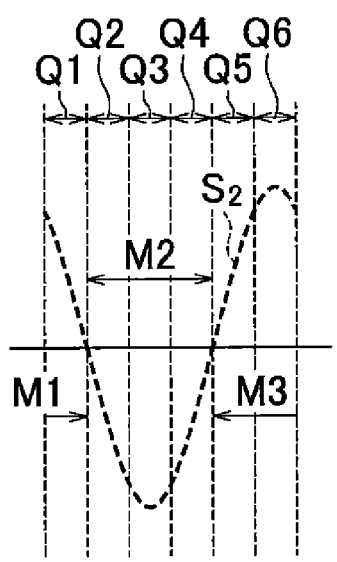
FIG. 14B is a schematic diagram illustrating the relative pole number setting process.

The reason why the second relative pole number r2 is set on the basis of the conditions in step S56 will be described below. FIG. 14A and FIG. 14B schematically illustrate signal waveforms of the first and second output signals $S_1$, $S_2$ at the time when a magnetic pole pair constituted of, for example, the magnetic pole M1 and the magnetic pole M2 in the magnet 61 passes by the first magnetic sensor 71. In FIG. 14A and FIG. 14B, in regions indicated by Q1, Q4, the pole number of the magnetic pole sensed by the second magnetic sensor 72 is the same as the pole number of the magnetic pole sensed by the first magnetic sensor 71. In regions indicated by Q2, Q3, Q5, Q6, the pole number of the magnetic pole sensed by the second magnetic sensor 72 is greater by one than the pole number of the magnetic pole sensed by the first magnetic sensor 71.

In the region Q1, both the sensor values $S_1$, $S_2$ satisfy the first condition that $S_1 \geq 0$ and $S_2 > 0$. In the regions Q2, Q3, both the sensor values $S_1$, $S_2$ satisfy the second condition that $S_1 > 0$ and $S_2 \leq 0$. In the region Q4, both the sensor values $S_1$, $S_2$ satisfy the third condition that $S_1 \leq 0$ and $S_2 < 0$. In the regions Q5, Q6, both the sensor values $S_1$, $S_2$ satisfy the fourth condition that $S_1 < 0$ and $S_2 \geq 0$. When one of the first condition and the third condition is satisfied, the first rotation angle computation unit 77A determines that the pole number of the magnetic pole sensed by the second magnetic sensor 72 is the same as the pole number of the magnetic pole sensed by the first magnetic sensor 71. On the other hand, when neither the first condition nor the third condition is satisfied, the first rotation angle computation unit 77A determines that the pole number of the magnetic pole sensed by the second magnetic sensor 72 is greater by one than the pole number of the magnetic pole sensed by the first magnetic sensor 71.

As shown in FIG. 11, if it is determined in step S32 that the present process is not the first process after the start of the normal rotation angle computing process (NO in step S32), the first rotation angle computation unit 77A proceeds on to step S34. In step S34, the first rotation angle computation unit 77A determines whether zero-crossing of each of the sensor values $S_1$, $S_2$, that is, inversion of the sign of each of the sensor values $S_1$, $S_2$ is detected, on the basis of the sensor values $S_1$, $S_2$ stored in the memory. If zero-crossing is not detected (NO in step S34), the first rotation angle computation unit 77A proceeds on to step S36.

If zero-crossing of one of the sensor values $S_1$, $S_2$ is detected in step S34 (YES in step S34), the first rotation angle computation unit 77A executes a relative pole number updating process (step S35). Specifically, the first rotation angle computation unit 77A changes the relative pole number r1 or r2, which is presently set for the magnetic sensor that outputs the sensor value zero-crossing of which is detected in step S34, to a number that is greater by one or a number that is smaller by one than the presently set relative pole number r1 or r2, on the basis of the rotation direction of the input shaft 8 (the magnet 61).

When the rotation direction of the input shaft 8 is the forward direction (the direction indicated by the arrow in FIG. 6), the first rotation angle computation unit 77A updates the relative pole number r1 or r2, which is presently set for the magnetic sensor that outputs the sensor value zero-crossing of which is detected in step S34, to a number that is greater by one than the presently set relative pole number r1 or r2. On the other hand, when the rotation direction of the input shaft 8 is the reverse direction, the first rotation angle computation unit 77A updates the relative pole number r1 or r2, which is presently set for the magnetic sensor that outputs the sensor value zero-crossing of which is detected in step S34, to a number that is smaller by one than the presently set relative pole number r1 or r2. Note that, as described above, the relative pole number that is smaller than the relative pole number of "one" by one is "eight". Further, the relative pole number that is greater than the relative pole number "eight" by one is "one".

The rotation direction of the input shaft 8 can be determined on the basis of, for example, the immediately preceding value and the present value of the output signal zero-crossing of which is detected and the present value of the other output signal. Specifically, when the output signal zero-crossing of which is detected is the first output signal $S_1$, if the condition that "the immediately preceding value of the first output signal $S_1$ is greater than zero, the present value of the first output signal $S_1$ is equal to or smaller than zero, and the second output signal $S_2$ is smaller than zero" or the condition that "the immediately preceding value of the first output signal $S_1$ is smaller than zero, the present value of the first output signal $S_1$ is equal to or greater than zero, and the second output signal $S_2$ is greater than zero" is satisfied, it is determined that the rotation direction is the forward direction (the direction indicated by the arrow in FIG. 6).

If the condition that "the immediately preceding value of the first output signal $S_1$ is equal to or greater than zero, the present value of the first output signal $S_1$ is smaller than zero, and the second output signal $S_2$ is greater than zero" or the condition that "the immediately preceding value of the first output signal $S_1$ is equal to or smaller than zero, the present value of the first output signal $S_1$ is greater than zero, and the second output signal $S_2$ is smaller than zero" is satisfied, it is determined that the rotation direction is the reverse direction. When the output signal zero-crossing of which is detected is the second output signal $S_2$, if the condition that "the immediately preceding value of the second output signal $S_2$ is greater than zero, the present value of the second output signal $S_2$ is equal to or smaller than zero, and the first output signal $S_1$ is greater than zero" or the condition that "the immediately preceding value of the second output signal $S_2$ is smaller than zero, the present value of the second output signal $S_2$ is equal to or greater than zero, and the first output signal $S_1$ is smaller than zero" is satisfied, it is determined that the rotation direction is the forward direction (the direction indicated by the arrow in FIG. 6). On the other hand, if the condition that "the immediately preceding value of the second output signal $S_2$ is equal to or greater than zero, the present value of the second output signal $S_2$ is smaller than zero, and the first output signal $S_1$ is smaller than zero" or the condition that "the immediately preceding value of the second output signal $S_2$ is equal to or smaller than zero, the present value of the second output signal $S_2$ is greater than zero, and the first output signal $S_1$ is greater than zero" is satisfied, it is determined that the rotation direction is the reverse direction.

When the relative pole number updating process ends, the first rotation angle computation unit 77A proceeds on to step S36. In step S36, the first rotation angle computation unit 77A determines whether a first computation mode applying condition that both the magnetic sensors 71, 72 continuously sense one and the same magnetic pole for two consecutive computation periods and the angular width error correction value E for the magnetic pole is stored in the memory is satisfied. In each computation period, the relative numbers of the magnetic poles sensed by the magnetic sensors 71, 72 can be recognized with the use of the first relative magnetic pole number r1 and the second relative magnetic pole number r2, respectively. Therefore, if the relative magnetic pole numbers r1, r2 for multiple computation periods from the n-th preceding computation period (n is a prescribed value) to the present computation period are stored in the memory, it is possible to determine whether both the magnetic sensors 71, 72 sense one and the same magnetic pole for two consecutive computation periods. Whether the angular width error correction value E for the magnetic pole is stored in the memory can be determined based on whether the angular width error correction value E is stored in the memory in association with the relative pole number of the magnetic pole (the value of the presently set r1 (=r2)). If the first computation mode applying condition is not satisfied (NO in step S36), the first rotation angle computation unit 77A proceeds on to step S37.

In step S37, the first rotation angle computation unit 77A computes the angular width error correction value E and the rotation angle θ(n) in the second computation mode. The first rotation angle computation unit 77A computes the angular width error correction value E and the rotation angle θ(n) on the basis of the sensor values $S_1(n)$, $S_1(n-1)$, $S_1(n-2)$, $S_2(n)$, $S_2(n-1)$, $S_2(n-2)$, which are sampled at three sampling timings. Then, the first rotation angle computation unit 77A determines whether the condition under which the highly reliable angular width error correction value E can be computed is satisfied (step S38).

The condition under which the highly reliable angular width error correction value E can be computed is the condition that both the magnetic sensors 71, 72 sense one and the same magnetic pole for three consecutive computation periods and none of the denominators of the fractions included in the expression (30) are zero. The fact that the condition that none of the denominators of the fractions included in the expression (30) are zero is satisfied means that none of the three expressions (32), (33), (34) are satisfied.

If it is determined that the condition under which the highly reliable angular width error correction value E can be computed is satisfied (YES in step S38), the first rotation angle computation unit 77A executes a process for storing the angular width error correction value E computed in step S37 in the area e1 (see FIG. 12) of the memory (step S39). Specifically, the first rotation angle computation unit 77A stores the angular width error correction value E in a storage location associated with the relative pole number (the value of the presently set r1 (=r2)) of the magnetic pole sensed by both the magnetic sensors 71, 72, among storage locations in the area e1 of the memory (step S39). Then, the first rotation angle computation unit 77A ends the normal rotation angle computing process in the present computation period.

If it is determined that the condition under which the highly reliable angular width error correction value E can be computed is not satisfied (NO in step S38), the first rotation angle computation unit 77A ends the normal rotation angle computing process in the present computation period without executing the process in step S39. If it is determined in step S36 that the first computation mode applying condition is satisfied (YES in step S36), the first rotation angle computation unit 77A computes the rotation angle θ(n) in the first computation mode (step S40). That is, the first rotation angle computation unit 77A computes the rotation angle θ(n) on the basis of the sensor values $S_1(n)$, $S_1(n-1)$, $S_2(n)$, $S_2(n-1)$, which are sampled at two sampling timings.

The rotation angle θ(n) computed in the first computation mode contains a rotation angle error due to an angular width error of each magnetic pole. Therefore, the first rotation angle computation unit 77A corrects the rotation angle error due to the angular width error with the use of the angular width error correction value E associated with the magnetic pole sensed by both the magnetic sensors 71, 72 (step S41).

If the angular width error correction value associated with the magnetic pole sensed by both the magnetic sensors 71, 72 is E and the rotation angle after the correction is θ'(n), the first rotation angle computation unit 77A computes the rotation angle θ'(n) after the correction according to the following expression (35).

$$\theta'(n) = \theta(n)/E \tag{35}$$

Then, the first rotation angle computation unit 77A ends the normal rotation angle computing process in the present computation period.

In the first computing method, because the rotation angle is computed on the basis of the sensor values sampled at two sampling timings, the influence of variations of the amplitudes due to temperature changes can be reduced, but variations of the angular widths of the magnetic poles cannot be compensated for. On the other hand, in the second computing method, because the rotation angle is computed on the basis of the sensor values sampled at three sampling timings, the influence of variations of the amplitudes due to temperature changes becomes greater than that in the first computing method, but the variations of the angular widths of the magnetic poles can be compensated for. In the normal rotation angle computing process in FIG. 11, the rotation angle can be computed on the basis of the sensor values sampled at the smallest possible number of sampling timings, and, in this case, the variations of the angular widths of the magnetic poles can be compensated for.

Although one embodiment of the invention has been described above, the invention may be implemented in various other embodiments. For example, in the above-described embodiment, each of the first rotation angle computation unit 77A and the second rotation angle computation unit 77B computes the rotation angle of a corresponding one of the input shaft 8 and the output shaft 9 on the basis of the output signals from the two magnetic sensors. Alternatively, the rotation angle of each of the input shaft 8 and the output shaft 9 may be computed on the basis of output signals from three or more magnetic sensors.

Figure 15:
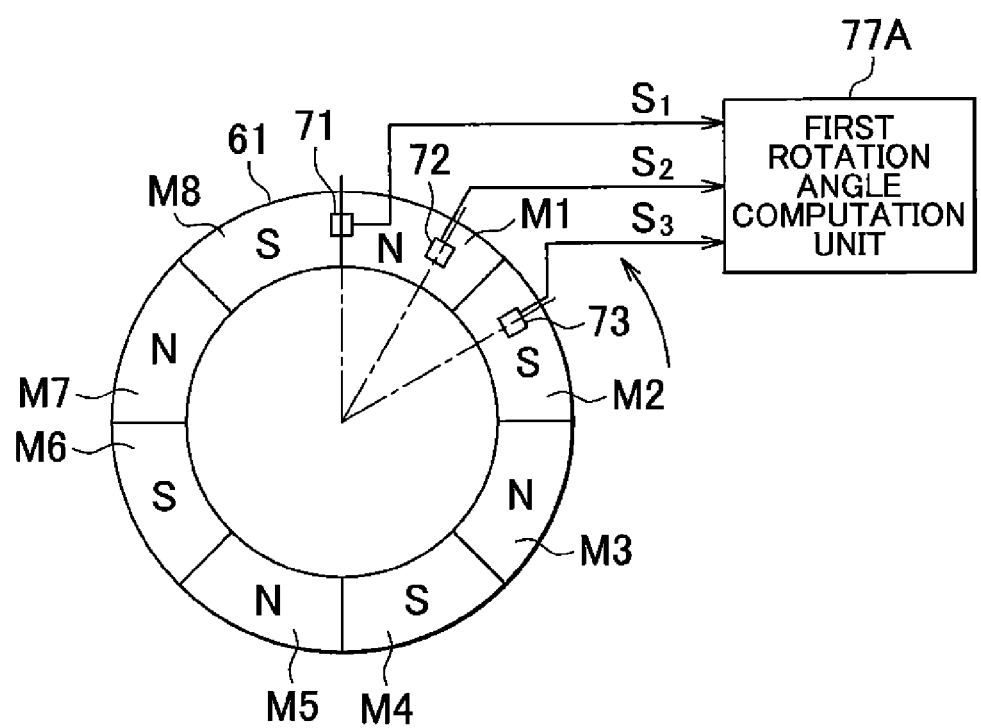
FIG. 15 is a schematic diagram illustrating the configuration of the first magnet and the arrangement of three magnetic sensors.

Hereinafter, an embodiment of the invention, in which the first rotation angle computation unit 77A computes a rotation angle of the input shaft 8 on the basis of output signals from three magnetic sensors will be described. FIG. 15 is a schematic diagram showing the configuration of the first magnet 61 and the arrangement of three magnetic sensors. In FIG. 15, portions that are the same as those in FIG. 6 are denoted by the same reference numerals as those in FIG. 6.

Three magnetic sensors 71, 72, 73 are arranged so as to face a lower annular end face of the first magnet 61. In the following description, the magnetic sensor 71 will be referred to as a first magnetic sensor 71, the magnetic sensor 72 will be referred to as a second magnetic sensor 72, and the magnetic sensor 73 will be referred to as a third magnetic sensor 73 where appropriate. The first magnetic sensor 71 and the second magnetic sensor 72 are arranged at an angular interval of 120° in electrical angle around the central axis of the input shaft 8. The second magnetic sensor 72 and the third magnetic sensor 73 are arranged at an angular interval of 120° in electrical angle around the central axis of the input shaft 8. Therefore, the first magnetic sensor 71 and the third magnetic sensor 73 are arranged at an angular interval of 240° in electrical angle around the central axis of the input shaft 8.

Figure 16:
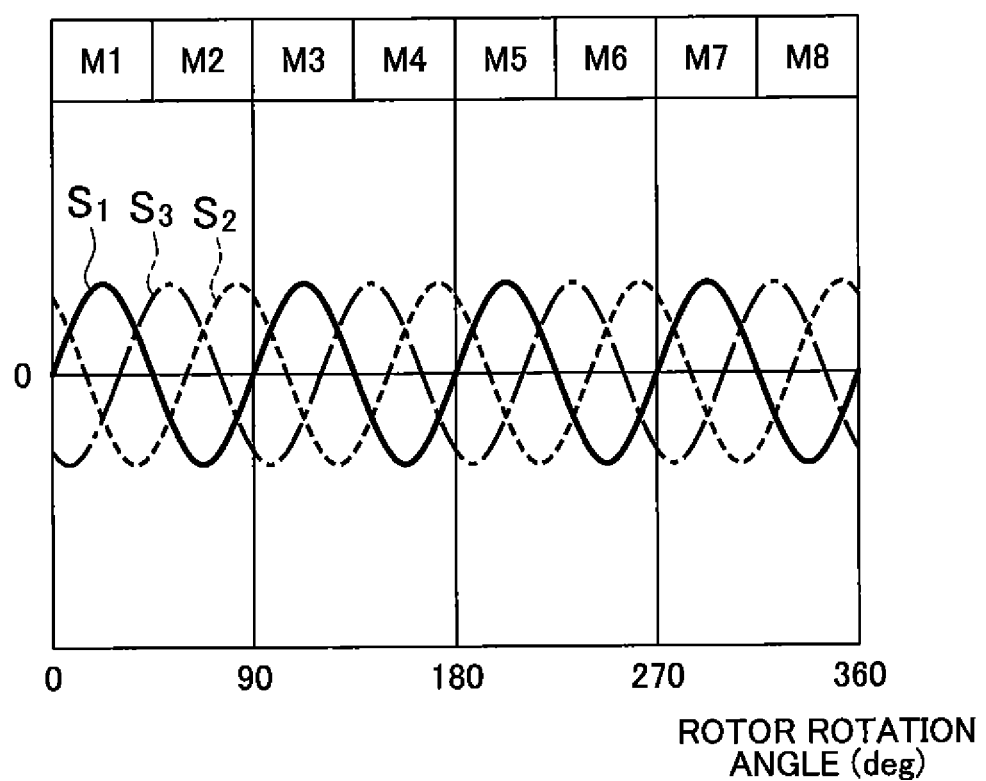
FIG. 16 is a schematic diagram illustrating waveforms of output signals from the first magnetic sensor, the second magnetic sensor, and a third magnetic sensor.

The direction indicated by an arrow in FIG. 15 is defined as the forward rotating direction of the input shaft 8. The rotation angle of the input shaft 8 increases as the input shaft 8 is rotated in the forward direction, whereas the rotation angle of the input shaft 8 decreases as input shaft 8 is rotated in the reverse direction. The magnetic sensors 71, 72, 73 output sinusoidal signals $S_1$, $S_2$, $S_3$ respectively, in accordance with the rotation of the input shaft 8, as illustrated in FIG. 16. Note that a rotation angle (deg) on the abscissa axis in FIG. 16 represents a mechanical angle.

In the following description, the output signal $S_1$ from the first magnetic sensor 71 will be referred to as a first output signal $S_1$ or a first sensor value $S_1$, the output signal $S_2$ from the second magnetic sensor 72 will be referred to as a second output signal $S_2$ or a second sensor value $S_2$, and the output signal $S_3$ from the third magnetic sensor 73 will be referred to as a third output signal $S_3$ or a third sensor value $S_3$, where appropriate. In the following description, a rotation angle of the input shaft 8 will be denoted by θ instead of $\theta_A$, for convenience of explanation. If each of the output signals $S_1$, $S_2$, $S_3$ is a sinusoidal signal and a rotation angle of the input shaft 8 is θ (electrical angle), the output signal $S_1$ from the first magnetic sensor 71 is expressed by $S_1 = A_1 \cdot \sin \theta$, the output signal $S_2$ from the second magnetic sensor 72 is expressed by $S_2 = A_2 \cdot \sin(\theta+120)$, and the output signal $S_3$ from the third magnetic sensor 73 is expressed by $S_3 = A_3 \cdot \sin(\theta+240)$. Each of $A_1$, $A_2$ and $A_3$ represents an amplitude.

The phase difference between the first output signal $S_1$ and the second output signal $S_2$ is 120°. The phase difference between the second output signal $S_2$ and the third output signal $S_3$ is also 120°. Thus, when (θ+120) is substituted by Θ, the second output signal $S_2$ can be expressed by $S_2 = A_2 \sin \Theta$, and the third output signal $S_3$ can be expressed by $S_3 = A_3 \cdot \sin(\Theta+120)$. Therefore, Θ can be computed with the use of the second output signal $S_2$ and the third output signal $S_3$ according to a computing method similar to the first computing method, and the rotation angle θ(=Θ−120) of the input shaft 8 can be computed from the computed Θ. This computing method will be referred to as a third computing method.

When the output signals $S_2$, $S_3$ from the second magnetic sensor 72 and the third magnetic sensor 73 are expressed with the use of a magnetic pole width error correction value E, the output signal $S_2(n)$ from the second magnetic sensor 72 is expressed by $S_2(n) = A_2 \cdot \sin(E_2\theta(n)+120)$, and the output signal $S_3(n)$ from the third magnetic sensor 73 is expressed by $S_3(n) = A_3 \cdot \sin(E_3\theta(n)+240)$. Note that $E_3$ is a magnetic pole width error correction value corresponding to a magnetic pole sensed by the third magnetic sensor 73. When the second magnetic sensor 72 and the third magnetic sensor 73 sense one and the same magnetic pole, $E_2$ is equal to $E_3$. Therefore, when $E_2$ and $E_3$ are denoted by E, the output signal $S_2(n)$ from the second magnetic sensor 72 is expressed by $S_2(n) = A_2 \cdot \sin(E\theta(n)+120)$, and the output signal $S_3(n)$ from the third magnetic sensor 73 is expressed by $S_3(n) = A_3 \cdot \sin(E\theta(n)+240)$.

When (Eθ(n)+120) is substituted by EΘ(n), the second output signal $S_2(n)$ is expressed by $S_2(n) = A_2 \cdot \sin E\Theta(n)$, and the third output signal $S_3(n)$ is expressed by $S_3(n) = A_3 \cdot \sin(E\Theta(n)+120)$. Therefore, EΘ(n) and E can be computed with the use of the second output signal $S_2$ and the third output signal $S_3$ according to a method similar to the above-described method. Because EΘ(n)=Eθ(n)+120, θ(n)=(EΘ(n)−120)/E is satisfied. Therefore, the rotation angle θ(n) of the input shaft 8 can be computed by substituting the computed EΘ(n) and E into the expression θ(n)=(EΘ(n)−120)/E. This computing method will be referred to as a fourth computing method.

When the second and third output signals $S_2$, $S_3$, which are sampled at three sampling timings and which are used to compute the rotation angle in the fourth computing method, are expressed by the following expressions (36a) to (36f) after the model of the expressions (28a) to (28f), an arithmetic expression used to compute EΘ and an arithmetic expression used to compute E can be expressed by the following expressions (37), (38), respectively.

$$S_2(n) = A_2 \sin(E\theta(n)+120) \tag{36a}$$

$$S_2(n-1) = A_2 \sin(E\theta(n-1)+120) \tag{36b}$$

$$S_2(n-2) = A_2 \sin(E\theta(n-2)+120) \tag{36c}$$

$$S_3(n) = A_3 \sin(E\theta(n)+120) \tag{36d}$$

$$S_3(n-1) = A_3 \sin(E\theta(n-1)+120) \tag{36e}$$

$$S_3(n-2) = A_3 \sin(E\theta(n-2)+120) \tag{36f}$$

$$E\theta[n] = \frac{1}{4}\cos^{-1}\left(1 - \frac{(3p_1'^2 p_2'^2 - 2p_1'^2 - 2p_2'^2 + p_1' p_2')^2}{2(p_1' - p_2')^2(p_1'^2 + p_1' p_2' + p_2'^2)}\right) - \frac{1}{4}\cos^{-1}\left(\frac{1}{2} - \frac{3}{2} \cdot \frac{p_1' p_2' + p_2'^2}{p_1'^2 + p_1' p_2' + p_2'^2}\right) \tag{37}$$

where $$p_1' = \frac{S_2[n]}{S_2[n-1]}$$

$$p_2' = \frac{S_3[n]}{S_3[n-1]}$$

$$E = \frac{1}{240} \cdot \cos^{-1}\left(\frac{q_1'^2 t'^2 - 2q_1' q_2' t' + q_2'^2}{2t'(S_2[n]S_3[n] - S_2[n-1]S_3[n-1])^2} - 1\right)$$

where $$q_1' = S_2[n-1]^2 - S_2[n]^2 \tag{38}$$

$$q_2' = S_3[n]^2 - S_3[n-1]^2$$

$$t' = \frac{S_2[n]S_3[n]q_3' + S_2[n-1]S_3[n-1]q_4' + S_2[n-2]S_3[N-2]q_1^*}{S_2[n]S_3[n]q_6' + S_2[n-1]S_3[n-1]q_6' + S_2[n-2]S_3[n-2]q_2'}$$

$$q_3' = S_2[n-2]^2 - S_2[n-1]^2$$

$$q_4' = S_2[n]^2 - S_2[n-2]^2$$

$$q_5' = S_3[n-1]^2 - S_3[n-2]^2$$

$$q_6' = S_3[n-2]^2 - S_3[n]^2$$

Note that the case where at least one of the denominators of the fractions included in the expression (38) used to compute E obtained in the case where at least one of the three conditions expressed by the following expressions (39), (40), (41) is satisfied.+

$$S_2[n]S_3[n] - S_2[n-1]S_3[n-1] = 0 \tag{39}$$

$$S_2[n]S_3[n]q_3' + S_2[n-1]S_3[n-1]q_4' + S_2[n-2]S_3[n-2]q_1' = 0 \tag{40}$$

$$S_2[n]S_3[n]q_5' + S_2[n-1]S_3[n-1]q_6' + S_2[n-2]S_3[n-2]q_2' = 0 \tag{41}$$

Figure 17:
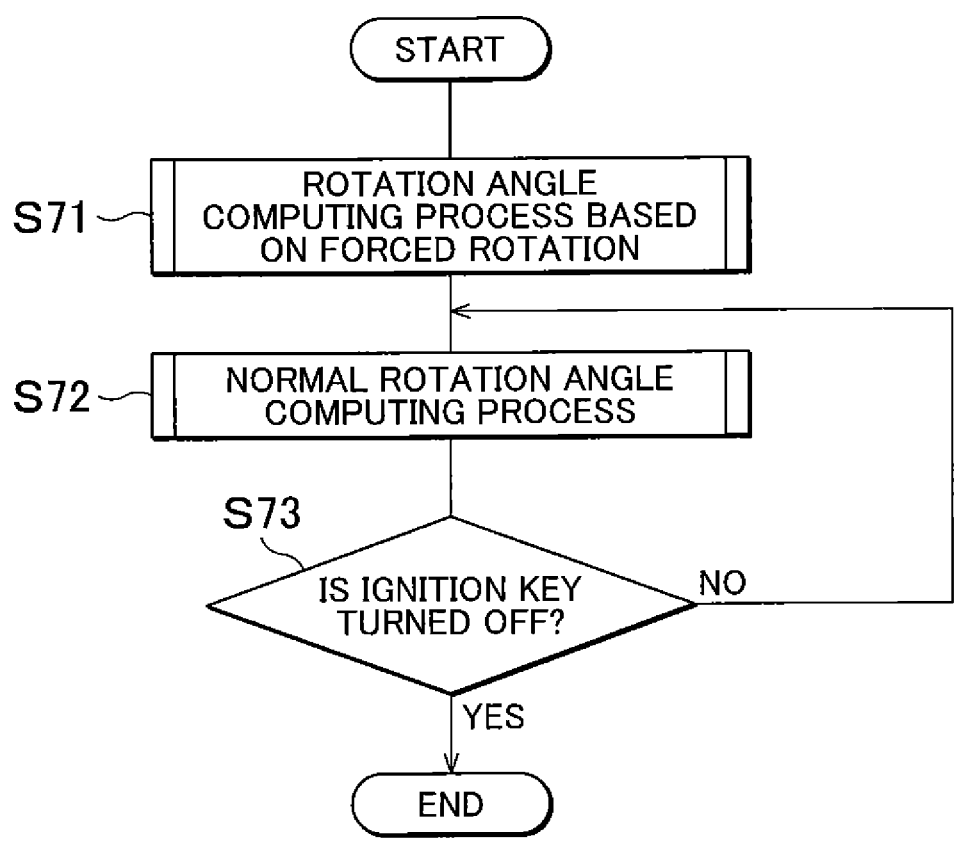
FIG. 17 is a flowchart showing the operation of the first rotation angle computation unit.

FIG. 17 is a flowchart showing the operation of the first rotation angle computation unit 77A. When the power supply for the torque computation ECU 77 is turned on, the first rotation angle computation unit 77A executes a rotation angle computing process based on forced rotation (step S71). Because this process is the same as the process in step S1 in FIG. 8 (the process shown in FIG. 9), description thereof will be omitted. When the rotation angle computing process based on forced rotation ends, the first rotation angle computation unit 77A executes a normal rotation angle computing process (step S72). The normal rotation angle computing process is continuously executed until the ignition key is turned off. When the ignition key is turned off (YES in step S73), the first rotation angle computation unit 77A ends the normal rotation angle computing process.

Figure 18:
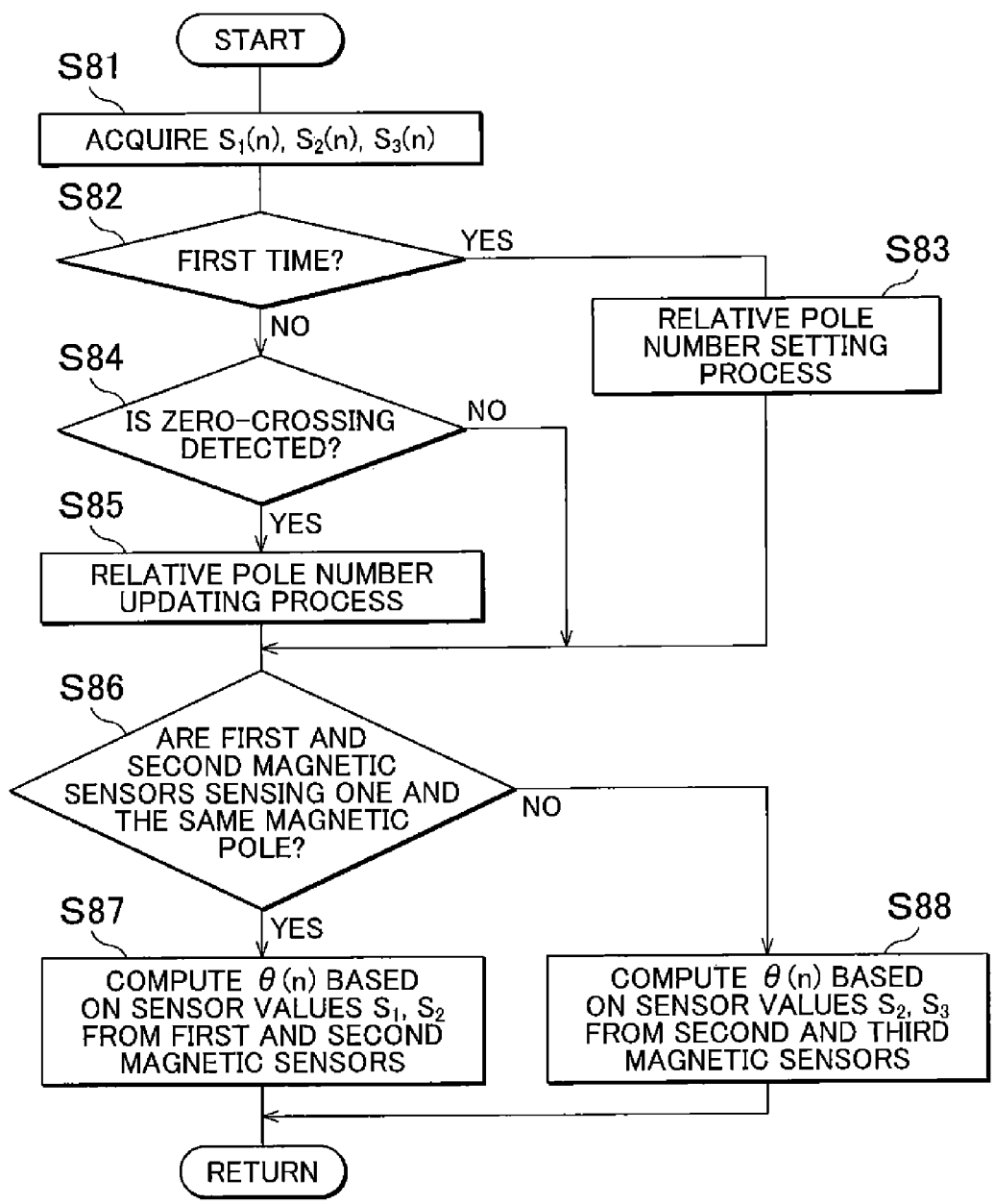
FIG. 18 is a flowchart showing the procedure of a normal rotation angle computing process in step S72 in FIG. 17.

FIG. 18 is a flowchart showing the procedure of the normal rotation angle computing process in step S72 in FIG. 17. The process in FIG. 18 is repeatedly executed with a predetermined computation period (sampling period). The numbers assigned to the magnetic poles, as relative numbers, using the magnetic pole sensed by the first magnetic sensor 71 at the start of the normal rotation angle computing process as a reference magnetic pole are defined as relative pole numbers. The relative pole number of a magnetic pole sensed by the first magnetic sensor 71 (hereinafter, referred to as "first relative pole number") is expressed by a variable r1, the relative magnetic pole number of a magnetic pole sensed by the second magnetic sensor 72 (hereinafter, referred to as "second relative pole number") is expressed by a variable r2, and the relative magnetic pole number of a magnetic pole sensed by the third magnetic sensor 73 (hereinafter, referred to as "third relative pole number") is expressed by a variable r3. Each of the relative pole numbers r1, r2, r3 takes an integer from 1 to 8, the relative pole number that is smaller than one by one is eight, and the relative pole number that is greater than eight by one is one.

The first rotation angle computation unit 77A obtains sensor values $S_1(n)$, $S_2(n)$, $S_3(n)$ (step S81). The first rotation angle computation unit 77A determines whether the present process is the first process after the start of the normal rotation angle computing process (step S82). If the present process is the first process after the start of the normal rotation angle computing process (YES in step S82), the first rotation angle computation unit 77A executes a relative pole number setting process (step S83).

Figure 19:
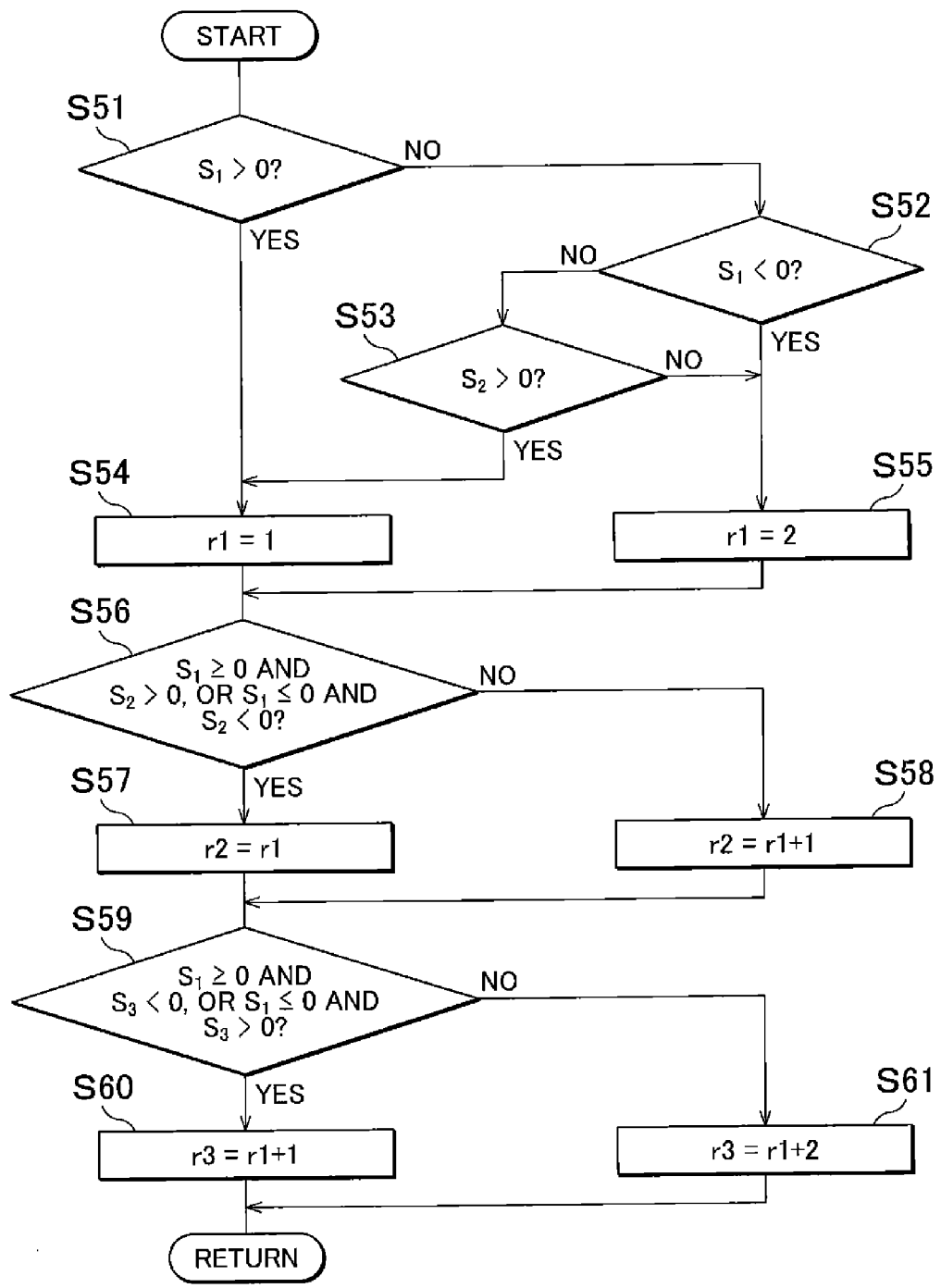
FIG. 19 is a flowchart showing the detailed procedure of a relative pole number setting process.

FIG. 19 is a flowchart showing the detailed procedure of the relative pole number setting process. In FIG. 19, steps in which the same processes as those in steps in FIG. 13 are executed are denoted by the same reference symbols as those in FIG. 13. Because the processes in steps S51 to S58 in FIG. 19 are the same as the processes in step S51 to S58 in FIG. 13, description thereof will be omitted. When the process in step S57 ends or when the process in step S58 ends, the first rotation angle computation unit 77A proceeds on to step S59.

In step S59, the first rotation angle computation unit 77A determines whether the condition that "$S_1 \geq 0$ and $S_3 < 0$" or the condition that "$S_1 \leq 0$ and $S_3 > 0$" is satisfied. When one of the above-described conditions is satisfied (YES in step S59), the first rotation angle computation unit 77A determines that the pole number of the magnetic pole sensed by the third magnetic sensor 73 is greater by one than the pole number of the magnetic pole sensed by the first magnetic sensor 71, and sets the third relative pole number r3 to a number greater by one than the first relative pole number r1 (r3=r1+) (step S60). Then, the first rotation angle computation unit 77A proceeds on to step S86 in FIG. 18.

When none of the conditions in step S59 is satisfied (NO in step S59), the first rotation angle computation unit 77A determines that the pole number of the magnetic pole sensed by the third magnetic sensor 73 is greater by two than the pole number of the magnetic pole sensed by the first magnetic sensor 71, and sets the third relative pole number r3 to a number that is greater by two than the first relative pole number r1 (r3=r1+2) (step S61). Then, the first rotation angle computation unit 77A proceeds on to step S86 in FIG. 18.

The reason why the third relative pole number r3 is set on the basis of the conditions in step S59 will be described below. FIG. 20A, FIG. 20B, and FIG. 20C schematically illustrate signal waveforms of the first, second and third output signals $S_1$, $S_2$, $S_3$ at the time when a magnetic pole pair constituted of, for example, the magnetic pole M1 and the magnetic pole M2 in the magnet 61 passes by the first magnetic sensor 71. In FIG. 20A, FIG. 20B, and FIG. 20C, in regions indicated by Q1, Q2 and regions indicated by Q4, Q5, the pole number of the magnetic pole sensed by the third magnetic sensor 73 is greater by one than the pole number of the magnetic pole sensed by the first magnetic sensor 71. In regions indicated by Q3, Q6, the pole number of the magnetic pole sensed by the third magnetic sensor 73 is greater by two than the pole number of the magnetic pole sensed by the first magnetic sensor 71.

In the regions Q1, Q2, both the sensor values $S_1$, $S_3$ satisfy the fifth condition that $S_1 \geq 0$ and $S_3 < 0$. In the region Q3, both the sensor values $S_1$, $S_3$ satisfy the sixth condition that $S_1 > 0$ and $S_3 \geq 0$. In the regions Q4, Q5, both the sensor values $S_1$, $S_3$ satisfy the seventh condition that $S_1 \leq 0$ and $S_3 > 0$. In the region Q6, both the sensor values $S_1$, $S_2$ satisfy the eighth condition that $S_1 < 0$ and $S_3 \leq 0$. When one of the fifth condition and the seventh condition is satisfied, the first rotation angle computation unit 77A determines that the pole number of the magnetic pole sensed by the third magnetic sensor 73 is greater by one than the pole number of the magnetic pole sensed by the first magnetic sensor 71. On the other hand, when neither the fifth condition nor the seventh condition is satisfied, the first rotation angle computation unit 77A determines that the pole number of the magnetic pole sensed by the third magnetic sensor 73 is greater by two than the pole number of the magnetic pole sensed by the first magnetic sensor 71.

When the rotation direction of the input shaft 8 is the forward direction (the direction indicated by the arrow in FIG. 15), the first rotation angle computation unit 77A updates the relative pole number r1, r2 or r3, which is presently set for the magnetic sensor that outputs the sensor value zero-crossing of which is detected in step S84, to a number that is greater by one than the presently set relative pole number r1, r2 or r3. On the other hand, when the rotation direction of the input shaft 8 is the reverse direction, the first rotation angle computation unit 77A updates the relative pole number r1, r2 or r3, which is presently set for the magnetic sensor that outputs the sensor value zero-crossing of which is detected in step S84, to a number that is smaller by one than the presently set relative pole number r1, r2 or r3. Note that, as described above, the relative pole number that is smaller than the relative pole number of "one" by one is "eight". Further, the relative pole number that is greater than the relative pole number "eight" by one is "one".

If zero-crossing of one of the sensor values $S_1$, $S_2$, $S_3$ is detected in step S84 (YES in step S84), the first rotation angle computation unit 77A executes a relative pole number updating process (step S85). Specifically, the first rotation angle computation unit 77A changes the relative pole number r1, r2 or r3, which is presently set for the magnetic sensor that outputs the sensor value zero-crossing of which is detected in step S84, to a number that is greater by one or a number that is smaller by one than the presently set relative pole number r1, r2 or r3 on the basis of the rotation direction of the input shaft 8 (the magnet 61).

When the rotation direction of the input shaft 8 is the forward direction (the direction indicated by the arrow in FIG. 15), the first rotation angle computation unit 77A updates the relative pole number r1, r2, or r3 presently set for the magnetic sensor that outputs the sensor value zero-crossing of which is detected in step S84, to a number that is greater by one than the presently set relative pole number r1, r2 or r3. On the other hand, when the rotation direction of the input shaft 8 is the reverse direction, the first rotation angle computation unit 77A updates the relative pole number r1, r2, or r3 presently set for the magnetic sensor that outputs the sensor value zero-crossing of which is detected in step S84, to a number that is smaller by one than the presently set relative pole number r1, r2 or r3. Note that, as described above, the relative pole number that is smaller than the relative pole number "one" by one is "eight". Further, the relative pole number that is greater than the relative pole number "eight" by one is "one".

The rotation direction of the input shaft 8 can be determined on the basis of, for example, the immediately preceding value and the present value of the output signal zero-crossing of which is detected and the present value of the other output signal. The methods of determining the rotation direction of the input shaft 8 when the output signal zero-crossing of which is detected is the first output signal $S_1$ and when the output signal zero-crossing of which is detected is the second output signal $S_2$ have already been explained in the description of the process in step S35 in FIG. 11.

The method of determining the rotation direction of the input shaft 8 when the output signal zero-crossing of which is detected is the third output signal $S_3$ will be described below. When the output signal zero-crossing of which is detected is the third output signal $S_3$, if the condition that "the immediately preceding value of the third output signal $S_3$ is greater than zero, the present value of the third output signal $S_3$ is equal to or smaller than zero, and the second output signal $S_2$ is greater than zero" or the condition that "the immediately preceding value of the third output signal $S_3$ is smaller than zero, the present value of the third output signal $S_3$ is equal to or greater than zero, and the second output signal $S_2$ is smaller than zero" is satisfied, it is determined that the rotation direction is the forward direction (the direction indicated by the arrow in FIG. 15).

On the other hand, if the condition that "the immediately preceding value of the third output signal $S_3$ is equal to or greater than zero, the present value of the third output signal $S_3$ is smaller than zero, and the second output signal $S_2$ is smaller than zero" or the condition that "the immediately preceding value of the third output signal $S_3$ is equal to or smaller than zero, the present value of the third output signal $S_3$ is greater than zero, and the second output signal $S_2$ is greater than zero" is satisfied, it is determined that the rotation direction is the reverse direction. When the relative pole number updating process ends, the first rotation angle computation unit 77A proceeds on to step S86. In step S86, the first rotation angle computation unit 77A determines whether the first and second magnetic sensors 71, 72 sense one and the same magnetic pole. This determination can be made based on whether the presently set first relative magnetic pole number r1 and the presently set second relative magnetic pole number r2 are equal to each other. If r1=r2, it is determined that the first magnetic sensor 71 and the second magnetic sensor 72 sense one and the same magnetic pole.

If it is determined that the first magnetic sensor 71 and the second magnetic sensor 72 sense one and the same magnetic pole (YES in step S86), the first rotation angle computation unit 77A computes the rotation angle θ(n) of the input shaft 8 on the basis of the sensor values $S_1$, $S_2$ from the first magnetic sensor 71 and the second magnetic sensor 72 (step S87). Specifically, the first rotation angle computation unit 77A computes the rotation angle θ(n) according to the first computing method or the second computing method. Further, the first rotation angle computation unit 77A ends the normal rotation angle computing process in the present computation period.

If it is determined in step S86 that the first magnetic sensor 71 and the second magnetic sensor 72 do not sense one and the same magnetic pole (NO in step S86), the first rotation angle computation unit 77A determines that the second magnetic sensor 72 and the third magnetic sensor 73 sense one and the same magnetic pole, and computes the rotation angle θ(n) of the input shaft 8 on the basis of the sensor values $S_1$, $S_3$ from the second magnetic sensor 72 and the third magnetic sensor 73 (step S88). Specifically, the first rotation angle computation unit 77A computes the rotation angle θ(n) according to the third computing method or the fourth computing method. Then, the first rotation angle computation unit 77A ends the normal rotation angle computing process in the present computation period.

In the normal rotation angle computing process in FIG. 18, the probability that the rotation angle θ(n) can be computed with the use of the output signals from two magnetic sensors (71, 72, or 72, 73) among the three magnetic sensors 71, 72, 73, which are sampled at a plurality of sampling timings, while these two magnetic sensors are sensing one and the same magnetic pole, is higher than that in the normal rotation angle computing process in FIG. 10. Therefore, when the rotation angle θ(n) is computed through the process in FIG. 18, the accuracy of detection of the rotation angle θ(n) is made higher than that when the rotation angle θ(n) is computed through the process in FIG. 10.

Figure 21A:
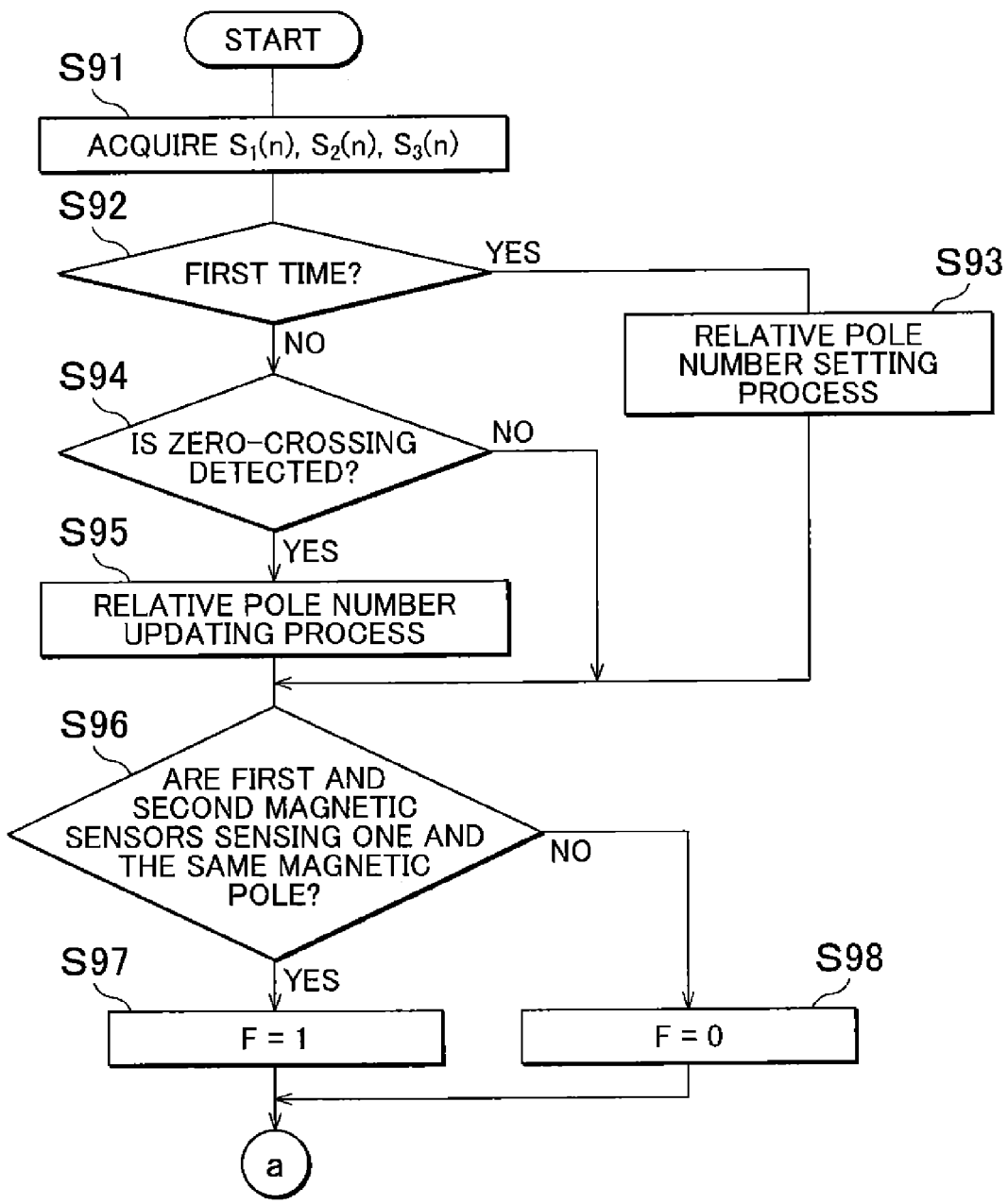
FIG. 21A is a flowchart showing a part of the procedure of a normal rotation angle computing process in step S72 in FIG. 17.
Figure 21B:
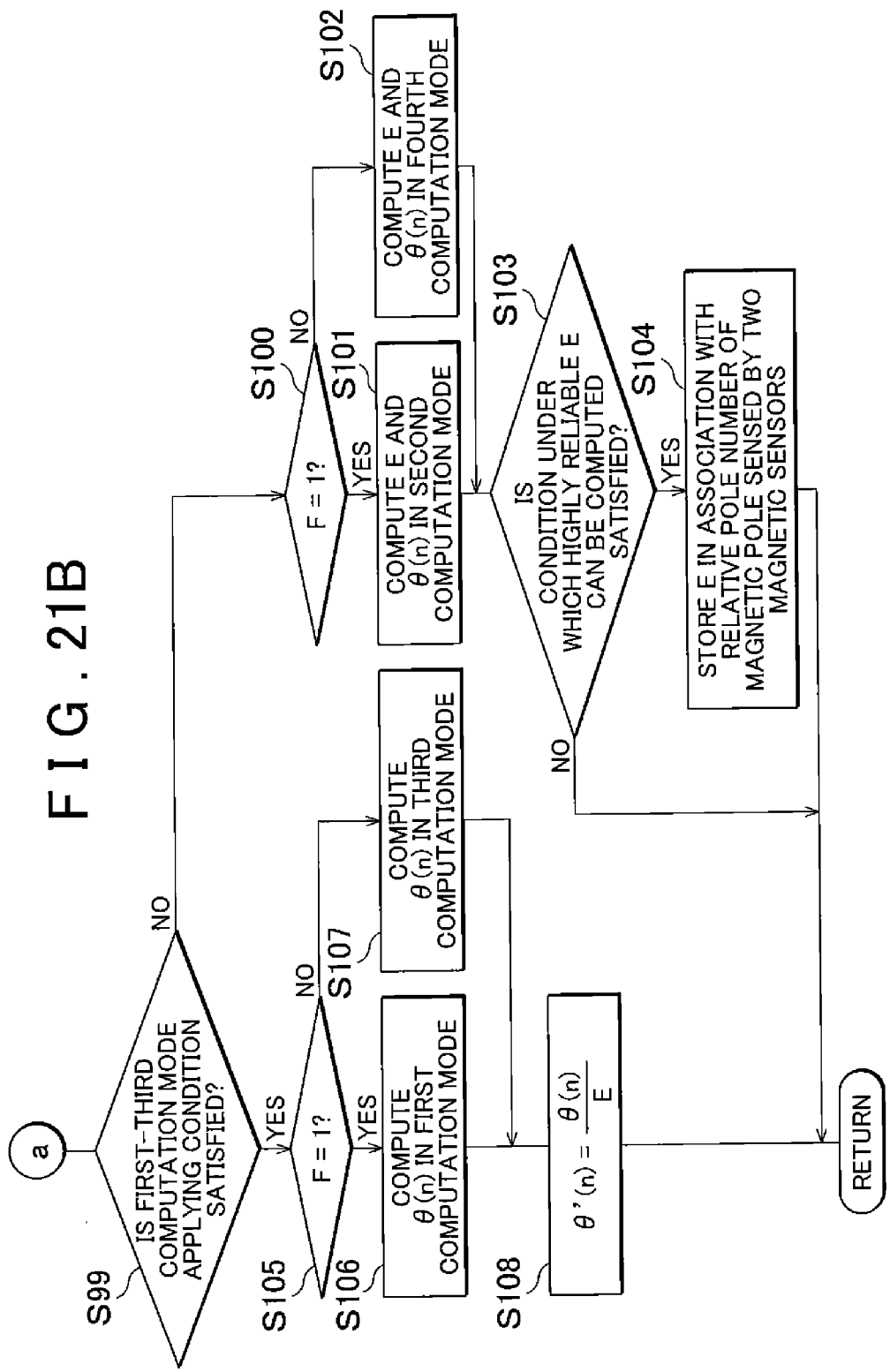
FIG. 21B is a flowchart showing the remaining part of the procedure of the normal rotation angle computing process in step S72 in FIG. 17.
Figure 22:
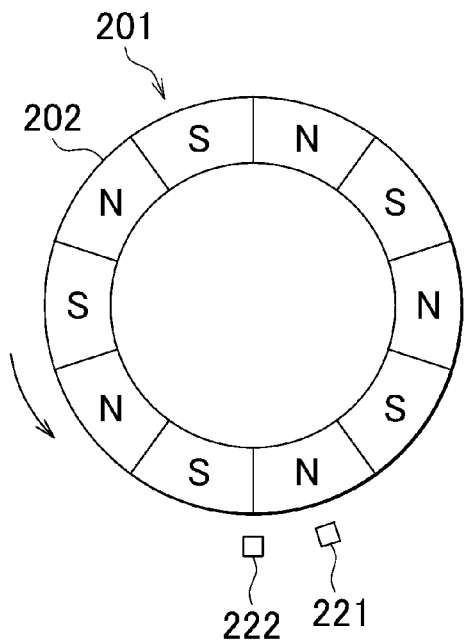
FIG. 22 is a schematic diagram illustrating a rotation angle detection method executed by a conventional rotation angle detection device.
Figure 23:
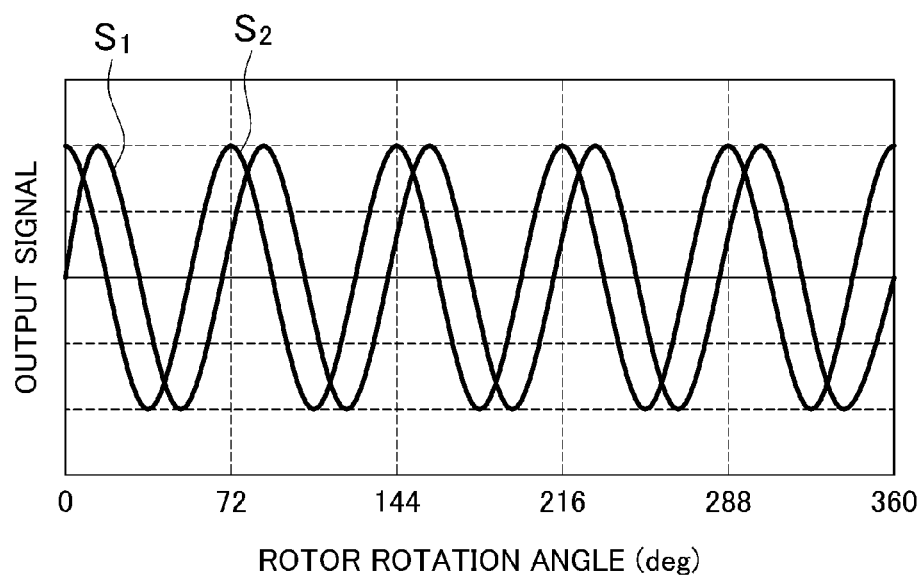
FIG. 23 is a schematic diagram illustrating waveforms of output signals from a first magnetic sensor and a second magnetic sensor.

FIG. 21A and FIG. 21B indicate a flowchart showing the procedure of another example of the normal rotation angle computing process in step S72 in FIG. 17. The process in FIG. 21A and FIG. 21B is repeatedly executed with a predetermined computation period (sampling period). As illustrated in FIG. 12, in the memory of the torque computation ECU 77, there are provided the area e1 where the angular width error correction values E are stored in association with the relative magnetic pole numbers 1 to 8, the area e2 where the first relative pole numbers r1(n−k) to r1(n) (k is a natural number equal to or greater than three) for multiple computation periods are stored, and the area e3 where the second relative pole numbers r2(n−k) to r2(n) for multiple computation periods are stored. In the memory in the torque computation ECU 77, as indicated by a broken line in FIG. 12, an area e4 where third relative pole numbers r3(n−k) to r3(n) corresponding to a plurality of computation periods are stored is provided.

The mode in which the rotation angle θ(n) is computed according to the first computing method will be referred to as a first computation mode, and the mode in which the rotation angle θ(n) is computed according to the second computing method will be referred to as a second computation mode. The mode in which the rotation angle θ(n) is computed according to the third computing method will be referred to as a third computation mode, and the mode in which the rotation angle θ(n) is computed according to the fourth computing method will be referred to as a fourth computation mode.

The first rotation angle computation unit 77A obtains the sensor values $S_1(n)$, $S_2(n)$, $S_3(n)$ (step S91). The first rotation angle computation unit 77A determines whether the present process is the first process after the start of the normal rotation angle computing process (step S92). If the present process is the first process after the start of the normal rotation angle computing process (YES in step S92), the first rotation angle computation unit 77A executes a relative pole number setting process (step S93). Because the relative pole number setting process is the same as the relative pole number setting process in step S83 in FIG. 18, description thereof will be omitted. When the relative pole number setting process ends, the first rotation angle computation unit 77A proceeds on to step S96.

If it is determined in step S92 that the present process is not the first process after the start of the normal rotation angle computing process (NO in step S92), the first rotation angle computation unit 77A proceeds on to step S94. In step S94, the first rotation angle computation unit 77A determines whether zero-crossing of each of the sensor values $S_1$, $S_2$, $S_3$, that is, inversion of the sign of each of the sensor values $S_1$, $S_2$, $S_3$ is detected, on the basis of the sensor values $S_1$, $S_2$, $S_3$ stored in the memory. If zero-crossing is not detected (NO in step S94), the first rotation angle computation unit 77A proceeds on to step S96.

If zero-crossing of one of the sensor values $S_1$, $S_2$, $S_3$ is detected in step S94 (YES in step S94), the first rotation angle computation unit 77A executes a relative pole number updating process (step S95). This relative pole number updating process is the same as the relative pole number updating process in the step S85 in FIG. 18, and hence description thereof will be omitted.

When the relative pole number updating process ends, the first rotation angle computation unit 77A proceeds on to step S96. In step S96, the first rotation angle computation unit 77A determines whether both the first magnetic sensor 71 and the second magnetic sensor 72 sense one and the same magnetic pole. This determination can be made based on whether the presently set first relative magnetic pole number r1 and the presently set second relative magnetic pole number r2 are equal to each other.

When the first magnetic sensor 71 and the second magnetic sensor 72 sense one and the same magnetic pole (YES in step S96), the first rotation angle computation unit 77A sets a flag F for storing the combination of magnetic sensors that are sensing one and the same magnetic pole (F=1) (step S97). Then, the first rotation angle computation unit 77A proceeds on to step S99 in FIG. 21B. On the other hand, when the first magnetic sensor 71 and the second magnetic sensor 72 do not sense one and the same magnetic pole (NO in step S96), the first rotation angle computation unit 77A determines that the second magnetic sensor 72 and the third magnetic sensor 73 sense one and the same magnetic pole, and resets the flag F (F=0) (step S97). Then, the first rotation angle computation unit 77A proceeds on to step S99 in FIG. 21B. Note that the memory is configured to store values of the flag F at least at three timings from the n-th preceding timing (n is a prescribed value) to the present timing.

In step S99, the first rotation angle computation unit 77A determines whether the first-third computation mode applying condition that two magnetic sensors in the same combination sense one and the same magnetic pole continuously for two consecutive computation periods and the angular width error correction value E associated with this magnetic pole is stored in the memory is satisfied. Whether the two magnetic sensors in the same combination sense one and the same magnetic pole continuously for two consecutive computation periods can be determined by comparing the present value and the immediately preceding value of the flag F with each other. Whether the angular width error correction value E associated with the magnetic pole is stored in the memory can be determined based on whether the angular width error correction value E is stored in the memory in association with the relative pole number of the magnetic pole (the value of the presently set r2).

When the first-third computation mode applying condition is not satisfied (NO in step S99), the first rotation angle computation unit 77A proceeds on to step S100. In step S100, the first rotation angle computation unit 77A determines whether the flag F is set (F=1). When the flag F is set (YES in step S100), the first rotation angle computation unit 77A computes the angular width error correction value E and the rotation angle θ(n) in the second computation mode (step S101). That is, the first rotation angle computation unit 77A computes the angular width error correction value E and the rotation angle θ(n) on the basis of the first and second sensor values ($S_1(n)$, $S_1(n-1)$, $S_1(n-2)$, $S_2(n)$, $S_2(n-1)$, $S_2(n-2)$), which are sampled at three sampling timings. Then, the first rotation angle computation unit 77A proceeds on to step S103.

On the other hand, when it is determined in step S100 that the flag F is not set (NO in step S100), the first rotation angle computation unit 77A computes the angular width error correction value E and the rotation angle θ(n) in the fourth computation mode (step S102). That is, the first rotation angle computation unit 77A computes the angular width error correction value E and the rotation angle θ(n) on the basis of the second and third sensor values ($S_2(n)$, $S_2(n-1)$, $S_2(n-2)$, $S_3(n)$, $S_3(n-1)$, $S_3(n-2)$), which are sampled at three sampling timings. Then, the first rotation angle computation unit 77A proceeds on to step S103.

In step S103, the first rotation angle computation unit 77A determines whether the condition under which the highly reliable angular width error correction value E can be computed is satisfied. In the case where the angular width error correction value E is computed in the second computation mode, the condition under which the highly reliable angular width error correction value E can be computed is the condition that the first and second magnetic sensors 71, 72 sense one and the same magnetic pole for three consecutive computation periods and none of the denominators of the fractions included in the expression (30) are zero. The fact that the condition that none of the denominators of the fractions included in the expression (30) are zero is satisfied means that none of the three expressions (32), (33), (34) are satisfied.

In the case where the angular width error correction value E is computed in the fourth computation mode, the condition under which the highly reliable angular width error correction value E can be computed is the condition that the second and third magnetic sensors 72, 73 sense one and the same magnetic pole for three consecutive computation periods and none of the denominators of the fractions included in the expression (38) are zero. The fact that the condition that none of the denominators of the fractions included in the expression (38) are zero is satisfied means that none of the three expressions (39), (40), (41) are satisfied.

When it is determined in step S103 that the condition under which the highly reliable angular width error correction value E can be computed is satisfied (YES in step S103), the first rotation angle computation unit 77A executes a process for storing the angular width error correction value E computed in step S101 or S102 in the area e1 of the memory (see FIG. 12) (step S104). Specifically, the first rotation angle computation unit 77A stores the angular width error correction value E in a storage location associated with the relative pole number (the value of the presently set r2) of the magnetic pole sensed by two of the three magnetic sensors 71, 72, 73, among storage locations in the area e1 of the memory. Then, the first rotation angle computation unit 77A ends the normal rotation angle computing process in the present computation period.

On the other hand, when it is determined that the condition under which the highly reliable angular width error correction value E can be computed is not satisfied (NO in step S103), the first rotation angle computation unit 77A ends the normal rotation angle computing process in the present computation period without executing the process in step S104. When it is determined in step S99 that the first-third computation mode applying condition is satisfied (YES in step S99), the first rotation angle computation unit 77A determines whether the flag F is set (F=1) (step S105). When the flag F is set (YES in step S105), the first rotation angle computation unit 77A computes the rotation angle θ(n) in the first computation mode (step S106). That is, the first rotation angle computation unit 77A computes the rotation angle θ(n) on the basis of the first and second sensor values $S_1(n)$, $S_1(n-1)$, $S_2(n)$, $S_2(n-1)$, which are sampled at two sampling timings. Then, the first rotation angle computation unit 77A proceeds on to step S108.

On the other hand, when it is determined that the flag F is not set (NO in step S105), the first rotation angle computation unit 77A computes the rotation angle θ(n) in the third computation mode (step S107). That is, the first rotation angle computation unit 77A computes the rotation angle θ(n) on the basis of the second and third sensor values $S_2(n)$, $S_2(n-1)$, $S_3(n)$, $S_3(n-1)$, which are sampled at two sampling timings. Then, the first rotation angle computation unit 77A proceeds on to step S108.

The rotation angle θ(n) computed in the first computation mode or the third computation mode contains a rotation angle error due to an angular width error of the magnetic pole. Therefore, in step S108, the first rotation angle computation unit 77A corrects the rotation angle error due to the angular width error with the use of the angular width error correction value E associated with the magnetic pole sensed by two magnetic sensors among the three magnetic sensors 71, 72, 73. If the angular width error correction value associated with the magnetic pole sensed by two magnetic sensors in the three magnetic sensors 71, 72, 73 is E and the rotation angle after correction is θ'(n), the first rotation angle computation unit 77A computes the rotation angle θ'(n) after correction according to the following expression (42).

$$\theta'(n)=\theta(n)/E \tag{42}$$

Then, the first rotation angle computation unit 77A ends the normal rotation angle computing process in the present computation period. In the first computing method or the third computing method, because the rotation angle is computed on the basis of the sensor values which are sampled at two sampling timings, the influence of variations of the amplitudes due to temperature changes can be reduced, but variations of the angular widths of the magnetic poles cannot be compensated for. On the other hand, in the second computing method or the fourth computing method, because the rotation angle is computed on the basis of the sensor values which are sampled at three sampling timings, the influence of variations of amplitudes due to temperature changes becomes greater than that in each of the first computing method and the third computing method, but the variations of the angular widths of the magnetic poles can be compensated for.

In the normal angle computing process shown in FIG. 21A and FIG. 21B, the rotation angle can be computed on the basis of the sensor values sampled at the smallest possible number of sampling timings, and, in addition, the variations of the angular widths of the magnetic poles can be compensated for. In the normal rotation angle computing process shown in FIG. 21A and FIG. 21B, the probability that the rotation angle θ(n) can be computed with the use of the output signals from two magnetic sensors (71, 72, or 72, 73) among the three magnetic sensors 71, 72, 73, which are sampled at a plurality of sampling timings while these two magnetic sensors are sensing one and the same magnetic pole, is higher than that in the normal rotation angle computing process in FIG. 11. Therefore, when the rotation angle θ(n) is computed through the process in FIG. 21A and FIG. 21B, the accuracy of detection of the rotation angle θ(n) is made higher than that when the rotation angle θ(n) is computed through the process in FIG. 11. Note that, the invention may be implemented in various other modified embodiments within the scope of the appended claims.

What is claimed is:

1. A rotation angle detection device comprising:
a plurality of sensors used to detect a rotation angle of a rotary body;
a sampling unit that samples an output signal from each of the sensors at prescribed timings; and
a computation unit that computes the rotation angle of the rotary body with use of a plurality of the output signals from at least two sensors among the plurality of the sensors, the output signals being sampled at a prescribed number of different timings, the prescribed number being two or more, wherein
where X is a number of multiple expressions obtained by mathematizing each of the plurality of the output signals used by the computation unit to compute the rotation angle of the rotary body and Y is a number of unknown quantities included in the multiple expressions, a condition that Y is greater than X is satisfied,
the computation unit is configured to compute the rotation angle of the rotary body by solving simultaneous equations constituted of the multiple expressions after setting Y equal to or smaller than X, where among the unknown quantities included in the multiple expressions, the amplitudes of a plurality of output signals from each one of the plurality of sensors, the plurality of output signals being sampled at different sampling timings, are equal to each other, and
each of the expressions including an amplitude and the rotation angle of the rotary body as the unknown quantities.

2. The rotation angle detection device according to claim 1, further comprising
a multipolar magnet that rotates in accordance with rotation of the rotary body, and that has a plurality of magnetic poles, wherein
the plurality of the sensors is a plurality of magnetic sensors that respectively output sinusoidal signals having a predetermined phase difference in accordance with rotation of the multipolar magnet,
the computation unit is configured to compute the rotation angle of the rotary body with use of four output signals from two sensors among the plurality of the sensors, the four output signals being sampled at two different timings,
the multiple expressions are constituted of four expressions obtained by mathematizing the four output signals, and
the computation unit sets Y equal to or smaller than X, where among the unknown quantities included in the four expressions, the amplitudes of the two output signals from each one of the two sensors, the two output signals being sampled at different sampling timings, are equal to each other.

3. The rotation angle detection device according to claim 1, further comprising
a multipolar magnet that rotates in accordance with rotation of the rotary body, and that has a plurality of magnetic poles, wherein
the plurality of the sensors is a plurality of magnetic sensors that respectively output sinusoidal signals having a predetermined phase difference in accordance with rotation of the multipolar magnet,
the computation unit is configured to compute the rotation angle of the rotary body with use of six output signals from two sensors among the plurality of the sensors, the six output signals being sampled at three different timings,
the multiple expressions are constituted of six expressions obtained by mathematizing the six output signals, each of the expressions including the amplitude, the rotation angle of the rotary body, and a piece of information regarding a magnetic pole width of each of the magnetic poles of the multipolar magnet as the unknown quantities, and
the computation unit sets Y equal to or smaller than X, where among the unknown quantities included in the six expressions, the amplitudes of the three output signals from each one of the two sensors, the three output signals being sampled at different sampling timings, are equal to each other, and all the pieces of the information regarding the magnetic pole width included in the six expressions are the same.

4. The rotation angle detection device according to claim 1, further comprising
a device that forcedly rotates the rotary body and causes the computation unit to compute the rotation angle of the rotary body immediately after a power supply for the rotation angle detection device is turned on.

5. An electric power steering system comprising:
a steering member operated to steer a vehicle;
an electric motor used to generate steering assist force;
a steering shaft that includes an input shaft, an output shaft, and a torsion bar that connects the input shaft and the output shaft to each other, and that is rotated by the steering member and the electric motor;
the rotation angle detection device according to claim 1, which detects the rotation angle of the rotary body, the rotary body being one of the input shaft and the output shaft; and
a device that forcedly rotates the electric motor temporarily and causes the computation unit of the rotation angle detection device to compute the rotation angle of the rotary body when a power supply is turned on.

6. The electric power steering system according to claim 5, further comprising:
an alarm device that informs a driver that the electric motor is forcedly rotated when the electric motor is forcedly rotated.

7. The rotation angle detection device according to claim 2, further comprising
a device that forcedly rotates the rotary body and causes the computation unit to compute the rotation angle of the rotary body immediately after a power supply for the rotation angle detection device is turned on.

8. The rotation angle detection device according to claim 3, further comprising
a device that forcedly rotates the rotary body and causes the computation unit to compute the rotation angle of the rotary body immediately after a power supply for the rotation angle detection device is turned on.

9. An electric power steering system comprising:
a steering member operated to steer a vehicle;
an electric motor used to generate steering assist force;
a steering shaft that includes an input shaft, an output shaft, and a torsion bar that connects the input shaft and the output shaft to each other, and that is rotated by the steering member and the electric motor;
the rotation angle detection device according to claim 2, which detects the rotation angle of the rotary body, the rotary body being one of the input shaft and the output shaft; and
a device that forcedly rotates the electric motor and causes the computation unit of the rotation angle detection device to compute the rotation angle of the rotary body when a power supply is turned on.

10. An electric power steering system comprising:
a steering member operated to steer a vehicle;
an electric motor used to generate steering assist force;
a steering shaft that includes an input shaft, an output shaft, and a torsion bar that connects the input shaft and the output shaft to each other, and that is rotated by the steering member and the electric motor;
the rotation angle detection device according to claim 3, which detects the rotation angle of the rotary body, the rotary body being one of the input shaft and the output shaft; and
a device that forcedly rotates the electric motor and causes the computation unit of the rotation angle detection device to compute the rotation angle of the rotary body when a power supply is turned on.

* * * * *